Figure 1:
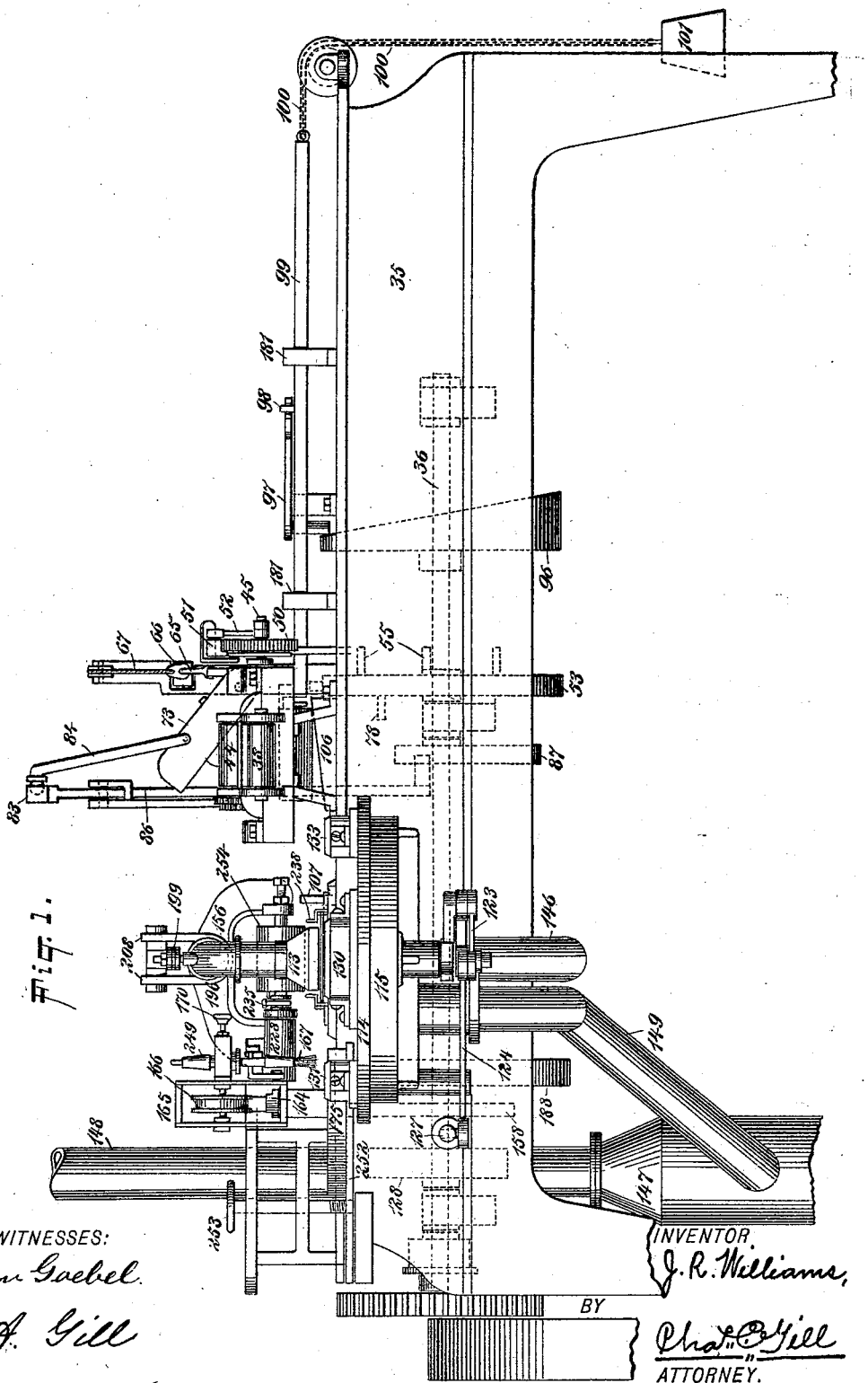

(No Model.) 18 Sheets—Sheet 1.
J. R. WILLIAMS.
MACHINE FOR MAKING CIGARETTES.
No. 521,749. Patented June 19, 1894.

WITNESSES:
William Goebel
M. A. Gill

INVENTOR
J. R. Williams,
BY
Chas. C. Gill
ATTORNEY.

(No Model.)  
18 Sheets—Sheet 2.

J. R. WILLIAMS.
MACHINE FOR MAKING CIGARETTES.

No. 521,749. Patented June 19, 1894.

WITNESSES  
William Goebel  
M. A. Gill

INVENTOR  
John R. Williams,  
BY Chas. C. Gill  
ATTORNEY.

(No Model.) 18 Sheets—Sheet 3.
J. R. WILLIAMS.
MACHINE FOR MAKING CIGARETTES.
No. 521,749. Patented June 19, 1894.
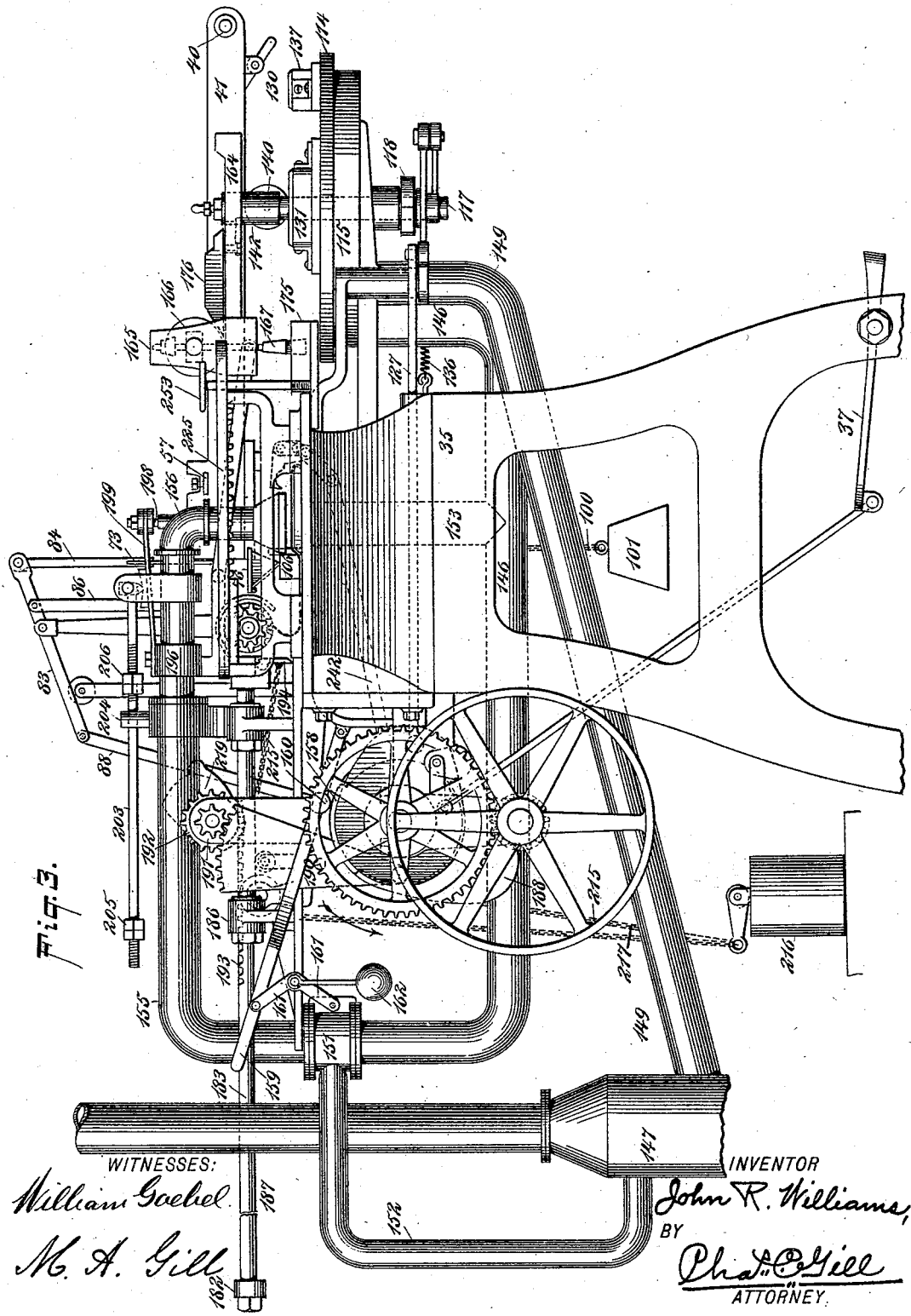
WITNESSES:
William Goebel
M. A. Gill
INVENTOR
John R. Williams,
BY
Chas. P. Gill
ATTORNEY.

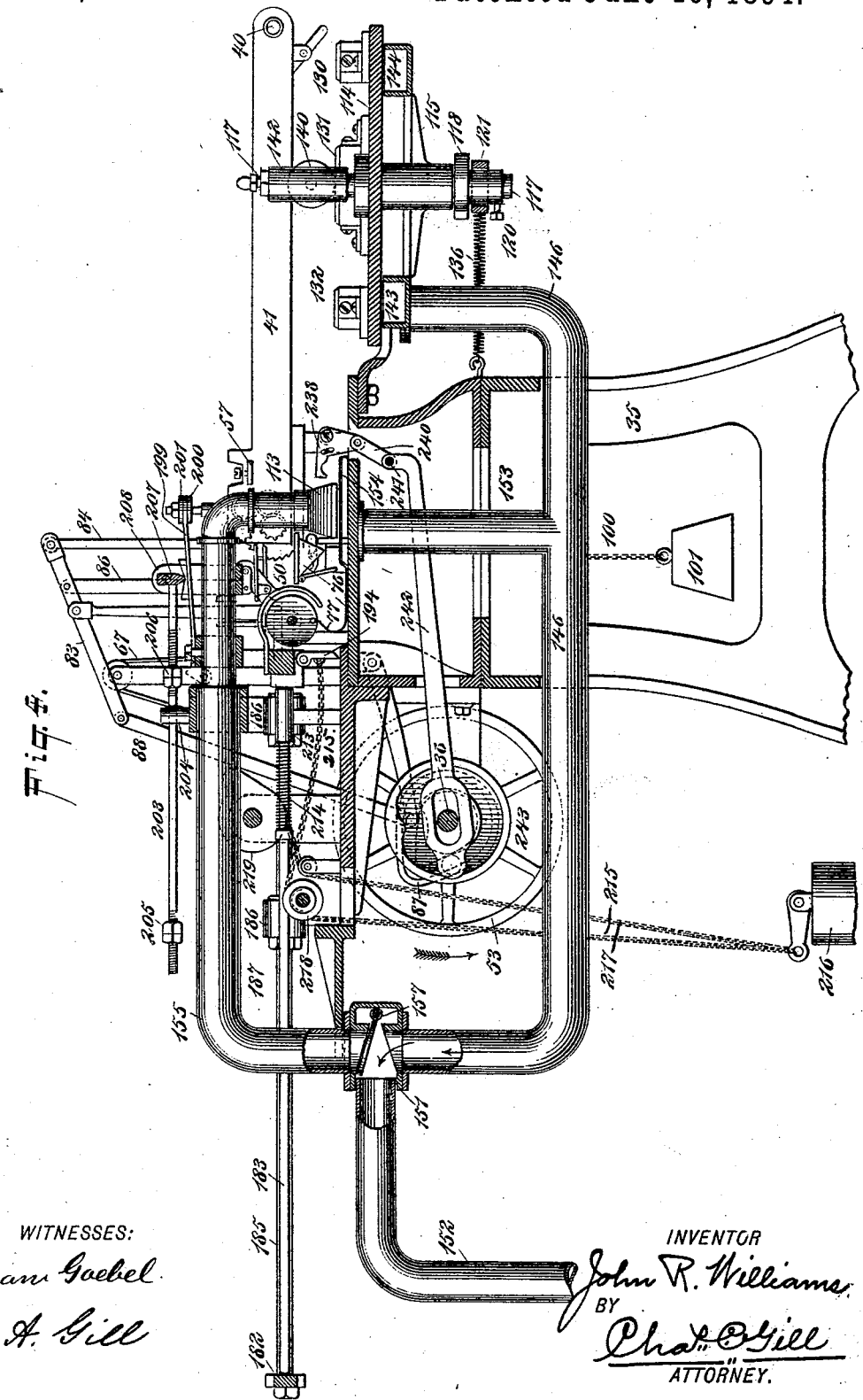

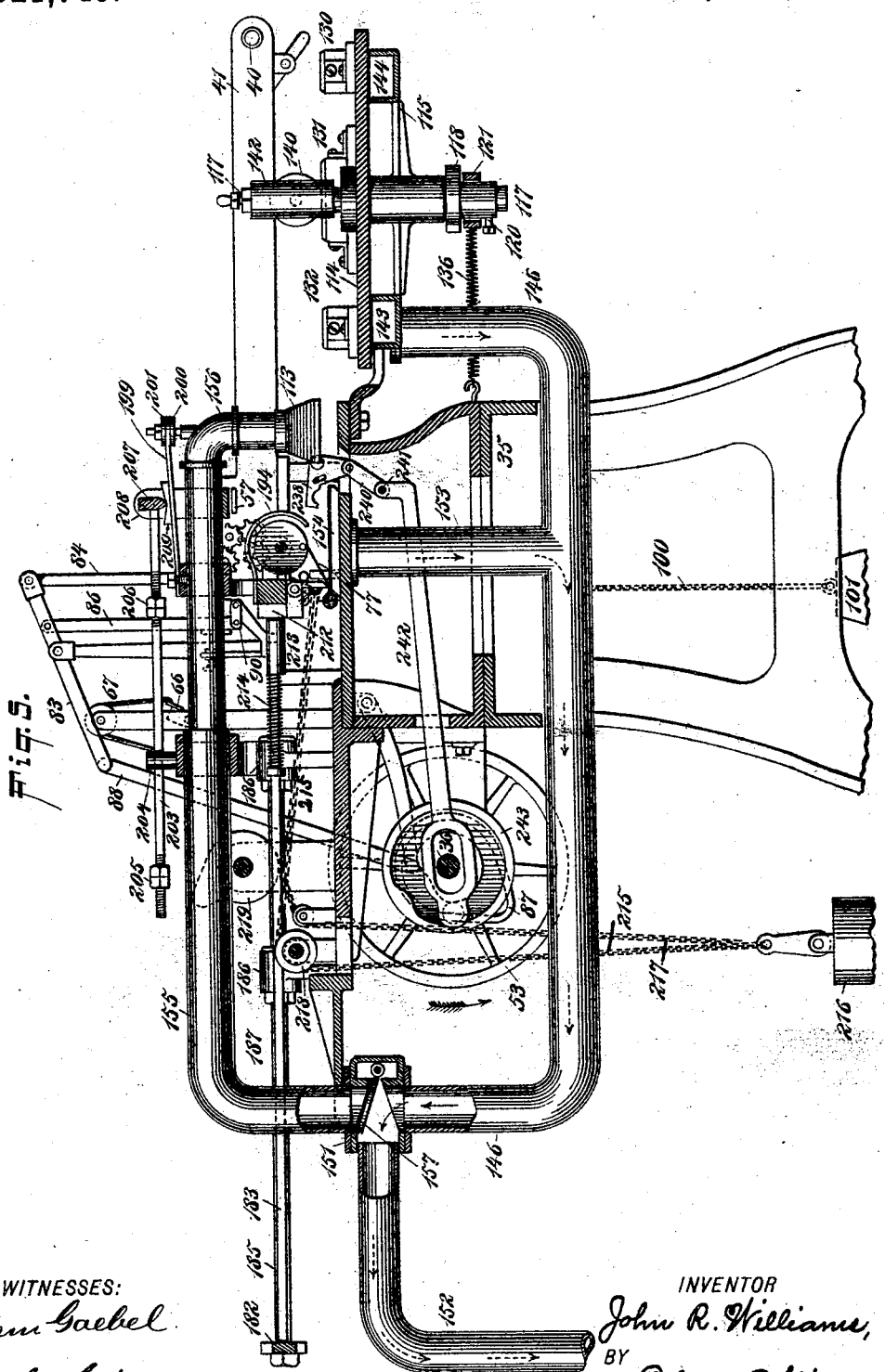

(No Model.) 18 Sheets—Sheet 6.
J. R. WILLIAMS.
MACHINE FOR MAKING CIGARETTES.
No. 521,749. Patented June 19, 1894.
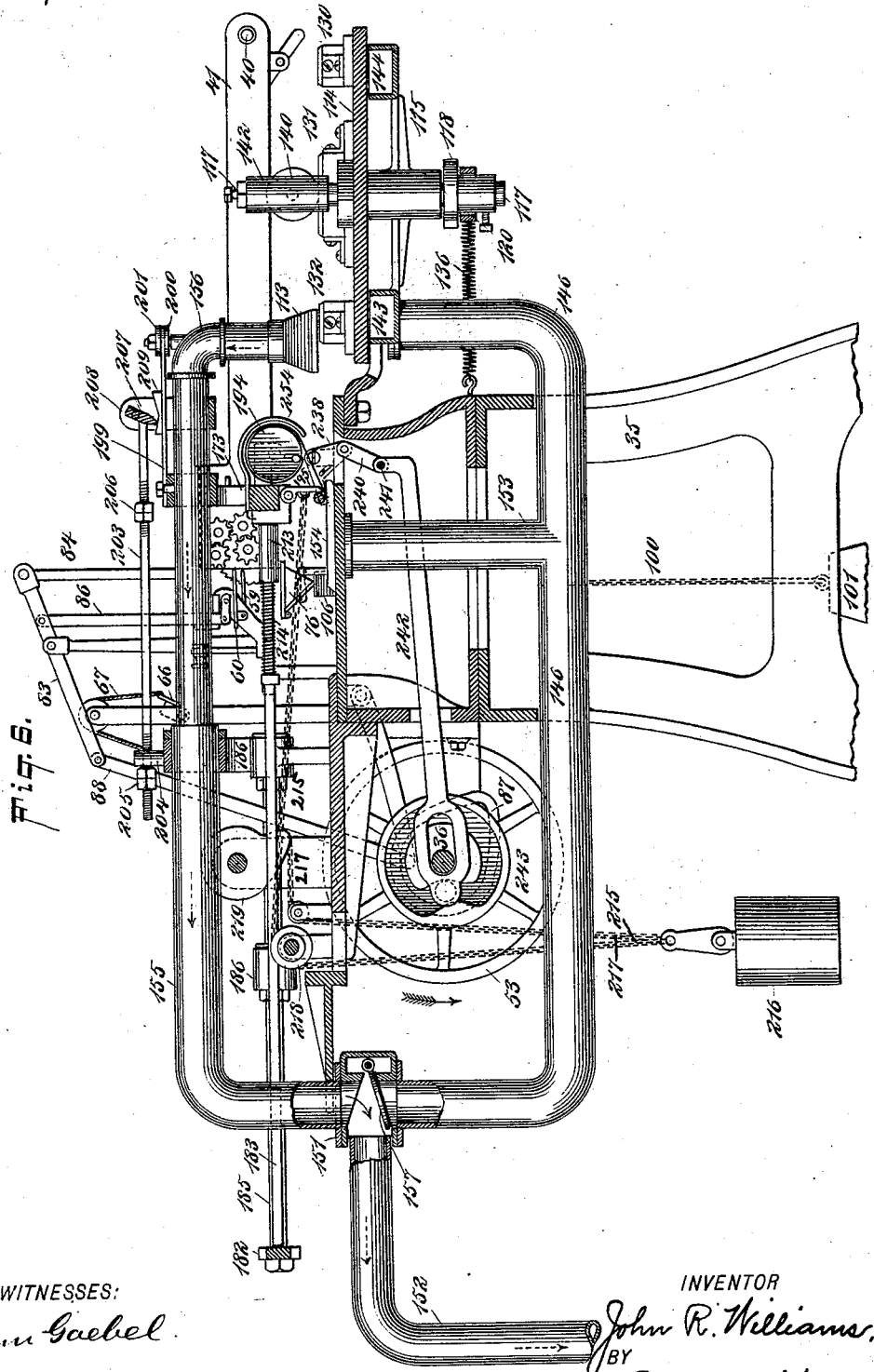
WITNESSES:
William Gaebel
M. H. Gill
INVENTOR
John R. Williams,
BY
Chas. O. Gill
ATTORNEY.

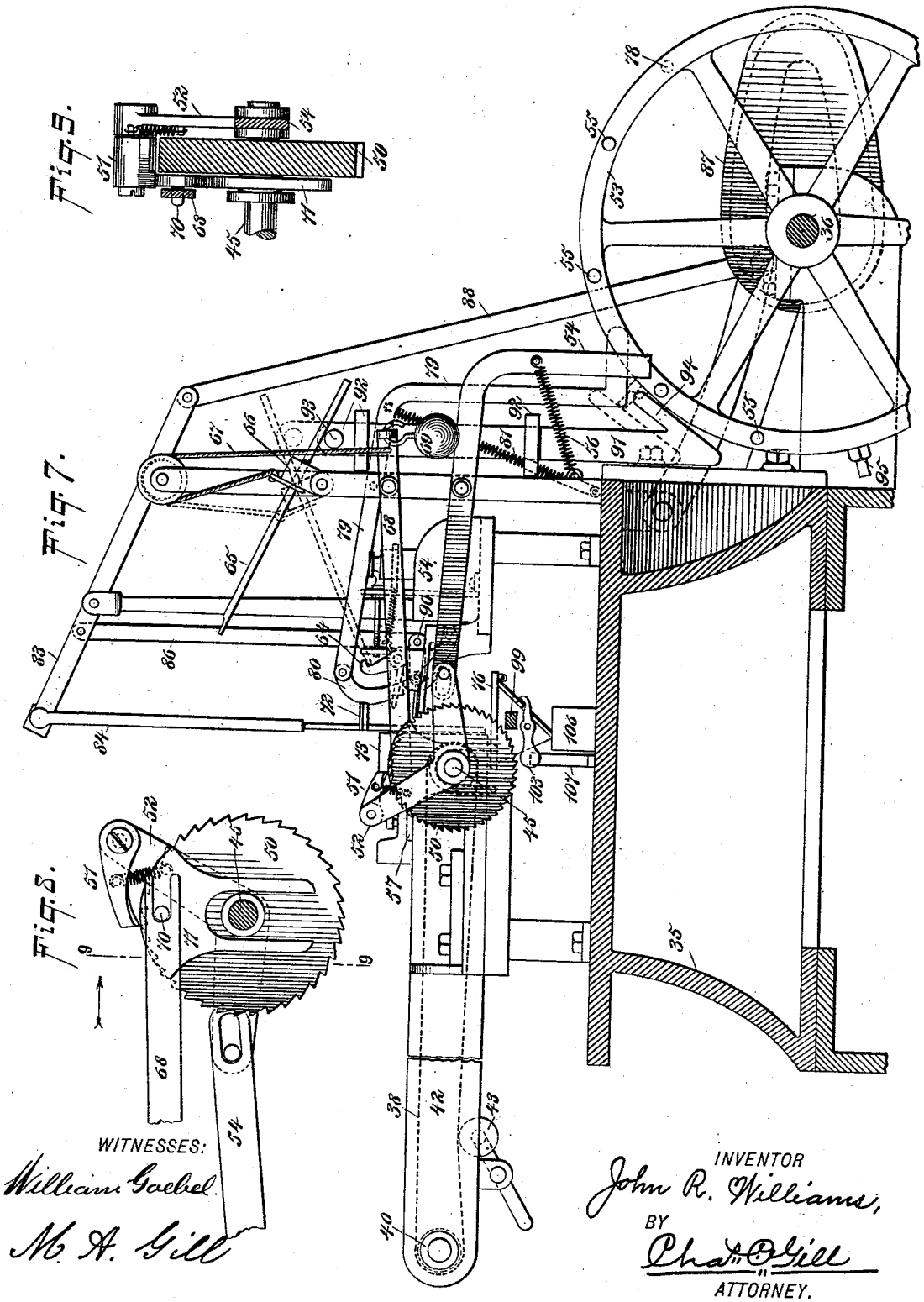

(No Model.) 18 Sheets—Sheet 8.
J. R. WILLIAMS.
MACHINE FOR MAKING CIGARETTES.
No. 521,749. Patented June 19, 1894.
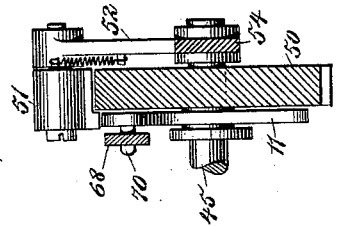
WITNESSES:
William Goebel
M. A. Gill
INVENTOR
John R. Williams,
BY
Chas. C. Gill
ATTORNEY.
THE NATIONAL LITHOGRAPHING COMPANY,
WASHINGTON, D. C.

(No Model.) 18 Sheets—Sheet 9.

J. R. WILLIAMS.
MACHINE FOR MAKING CIGARETTES.

No. 521,749. Patented June 19, 1894.

WITNESSES:
William Gaebel
M. A. Gill

INVENTOR
J. R. Williams,
BY
Chas. O. Gill
ATTORNEY.

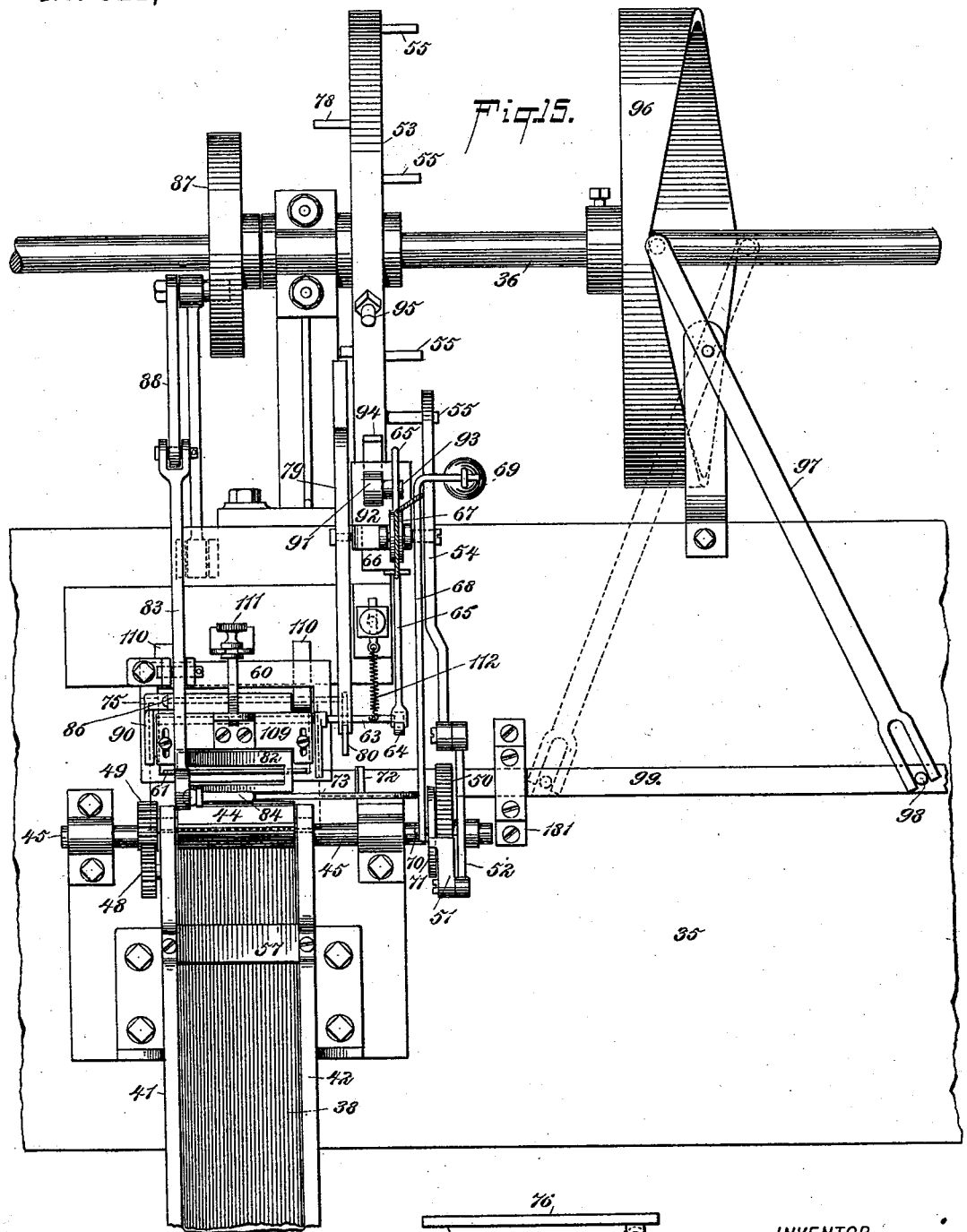

(No Model.)  18 Sheets—Sheet 11.
J. R. WILLIAMS.
MACHINE FOR MAKING CIGARETTES.
No. 521,749. Patented June 19, 1894.
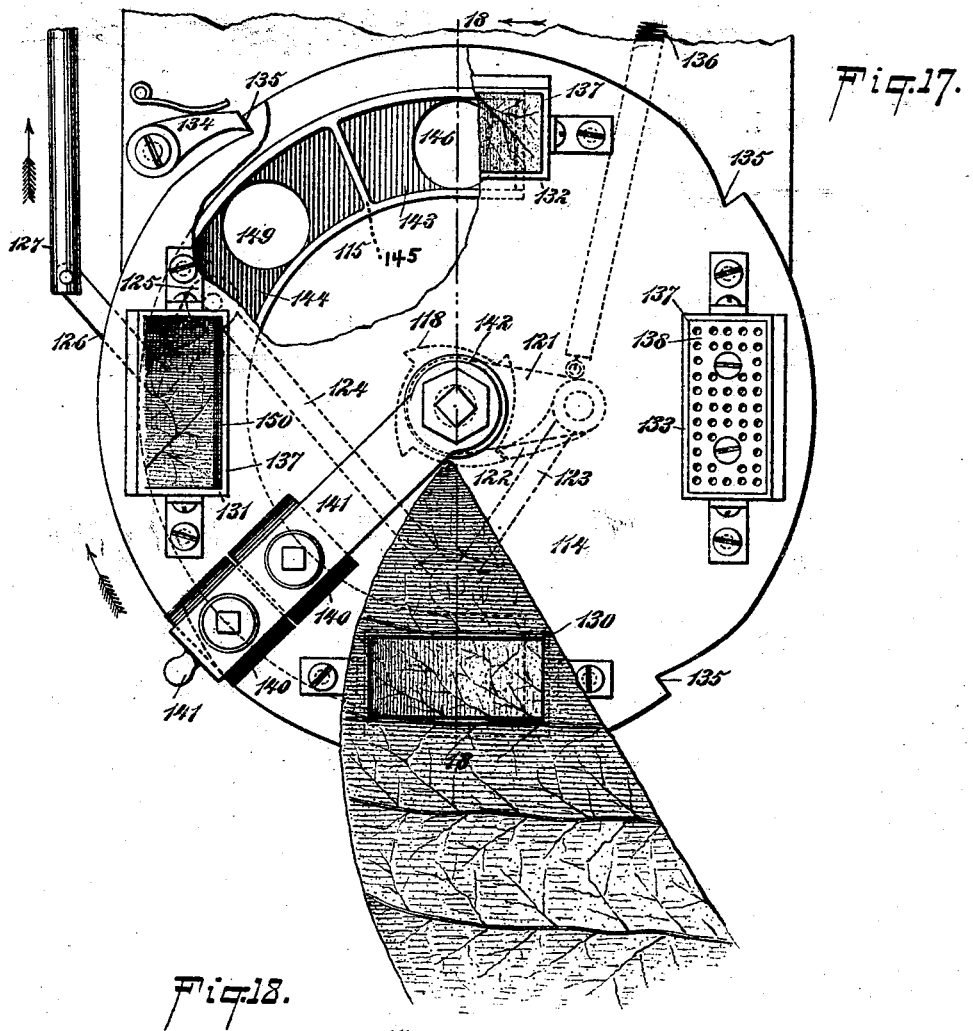
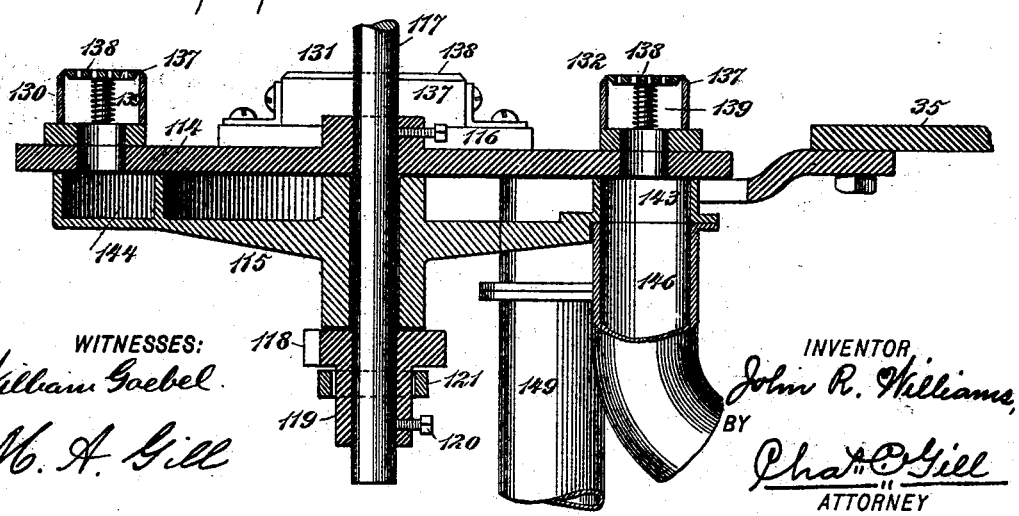
WITNESSES:
William Goebel
M. A. Gill
INVENTOR
John R. Williams,
BY
Chas. G. Gill
ATTORNEY (No Model.) 18 Sheets—Sheet 12.
J. R. WILLIAMS.
MACHINE FOR MAKING CIGARETTES.
No. 521,749. Patented June 19, 1894.
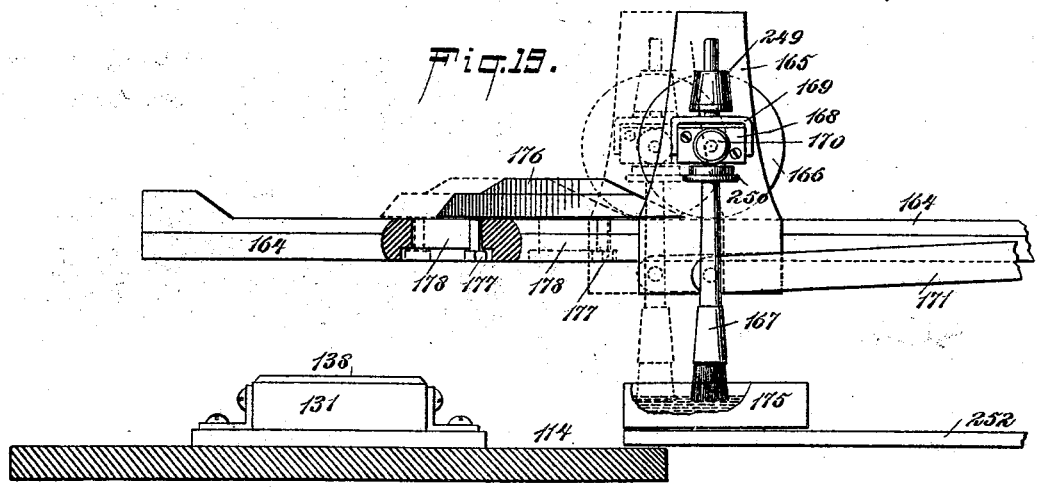
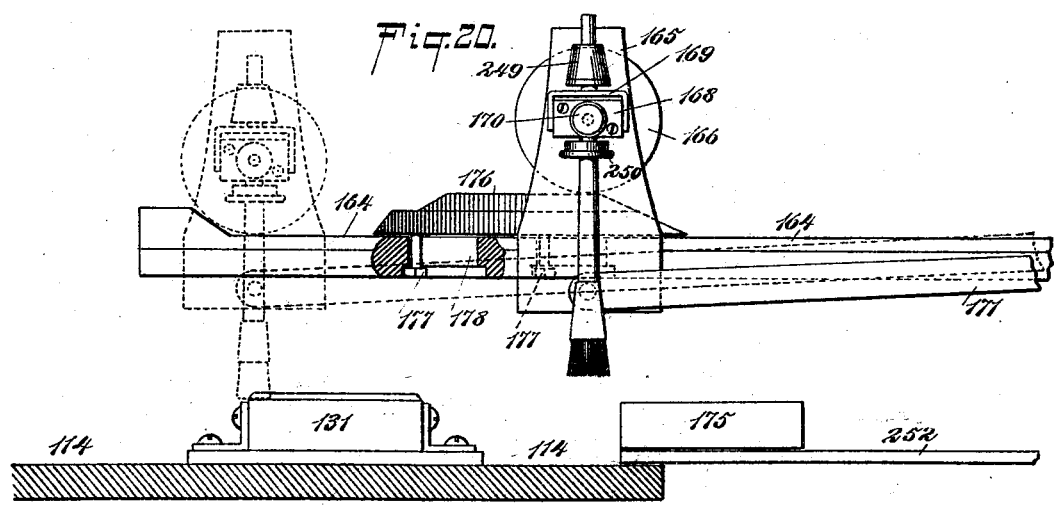
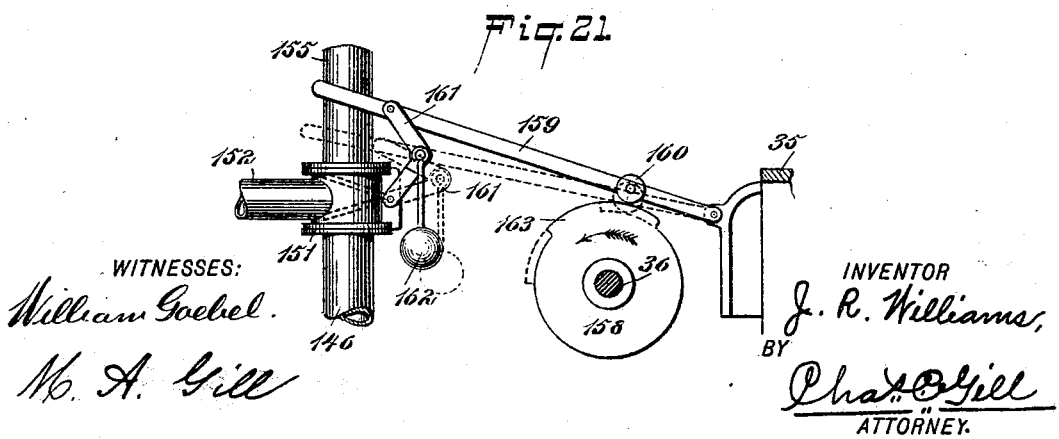
WITNESSES:
William Goebel.
M. A. Gill
INVENTOR
J. R. Williams,
BY
Chas. H. Gill
ATTORNEY.

(No Model.) 18 Sheets—Sheet 13.
J. R. WILLIAMS.
MACHINE FOR MAKING CIGARETTES.
No. 521,749. Patented June 19, 1894.
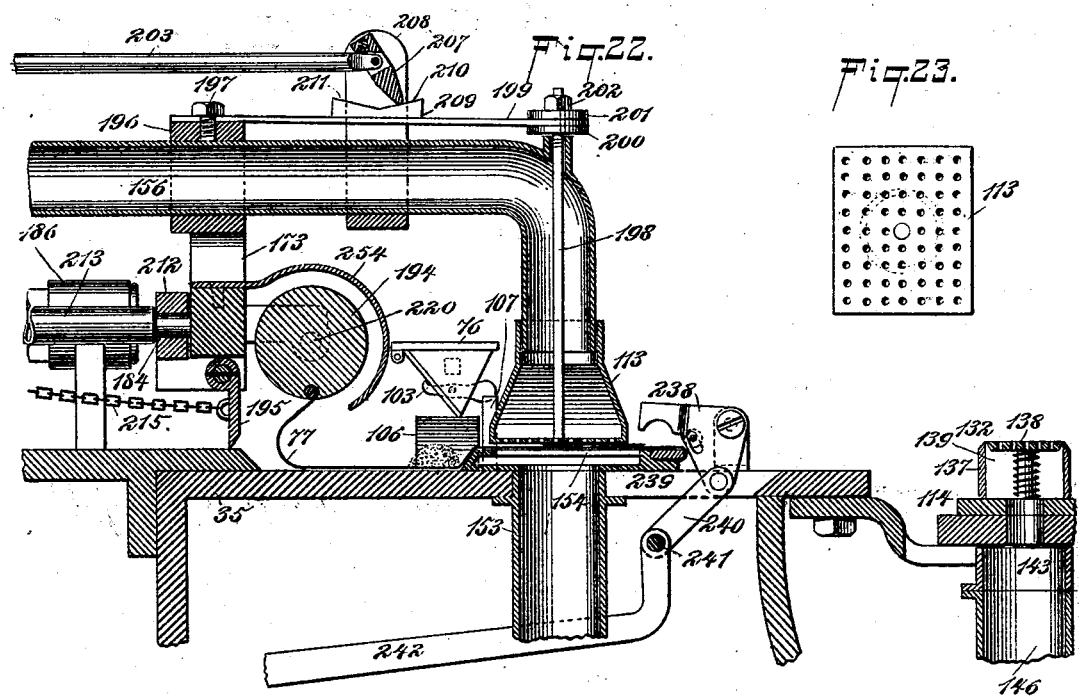
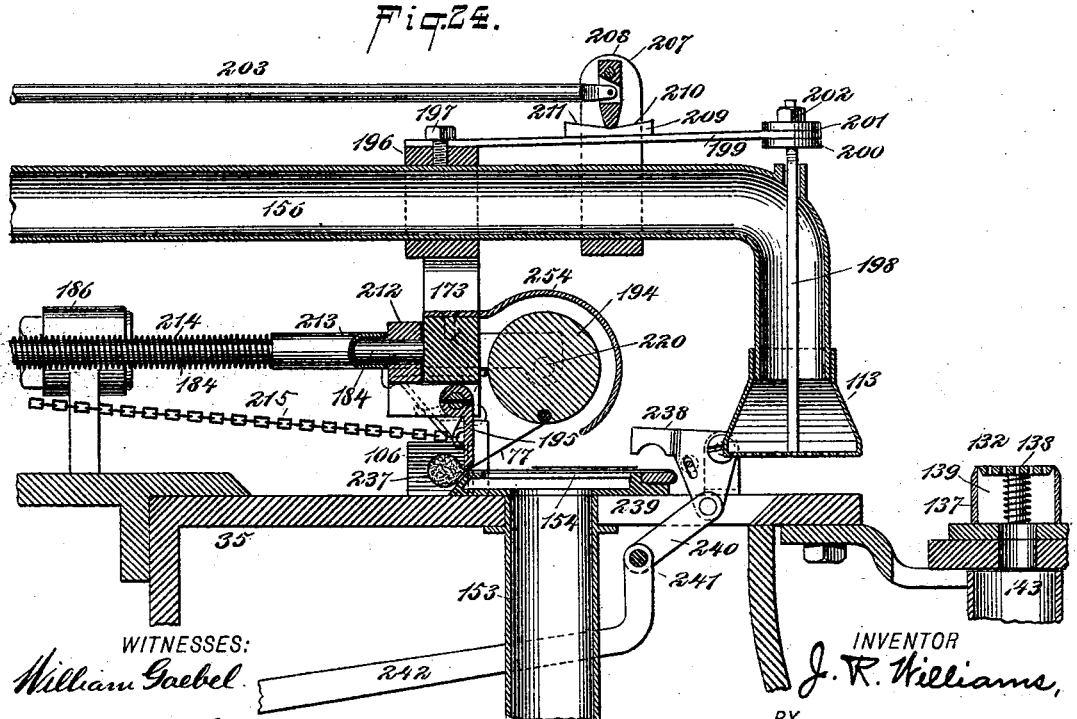
WITNESSES:
William Gaebel
M. A. Gill
INVENTOR
J. R. Williams,
BY
Chas. C. Gill
ATTORNEY.

(No Model.) 18 Sheets—Sheet 14.
J. R. WILLIAMS.
MACHINE FOR MAKING CIGARETTES.
No. 521,749. Patented June 19, 1894.

WITNESSES:
William Goebel
M. A. Gill

INVENTOR
J. R. Williams,
BY
Chas. O. Gill
ATTORNEY.

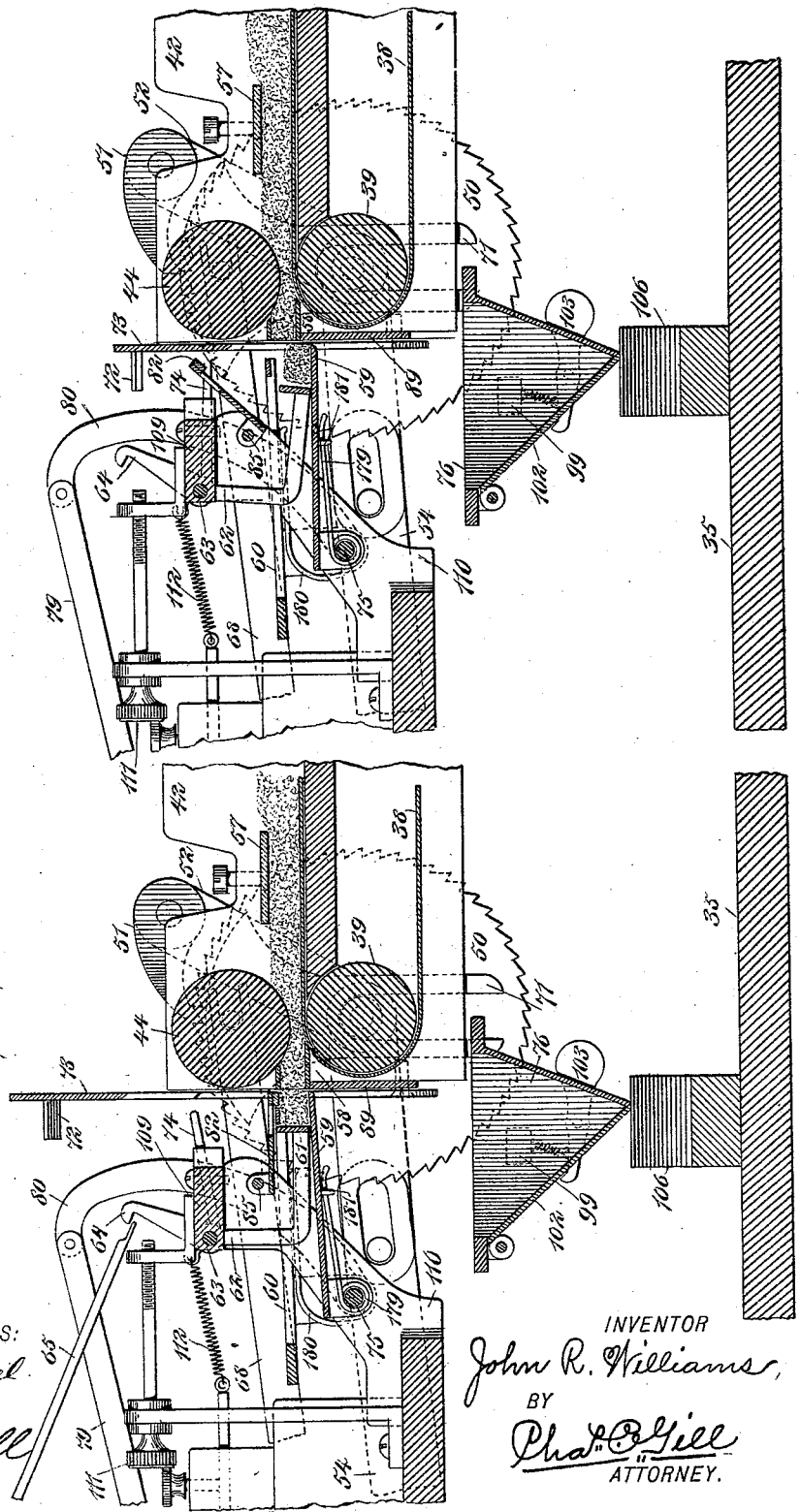

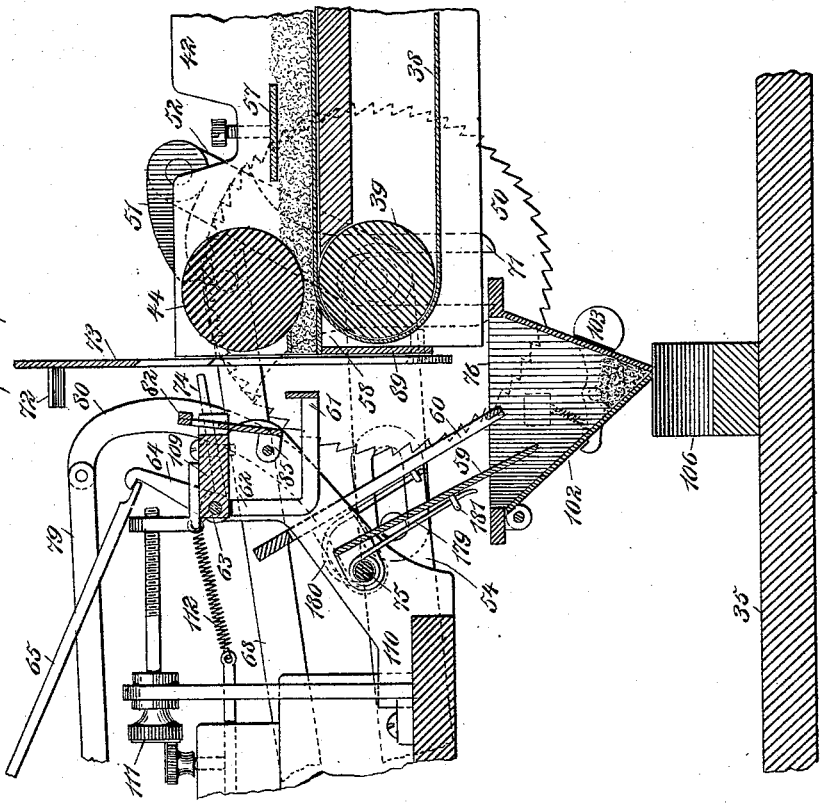

(No Model.) 18 Sheets—Sheet 17.
J. R. WILLIAMS.
MACHINE FOR MAKING CIGARETTES.
No. 521,749. Patented June 19, 1894.
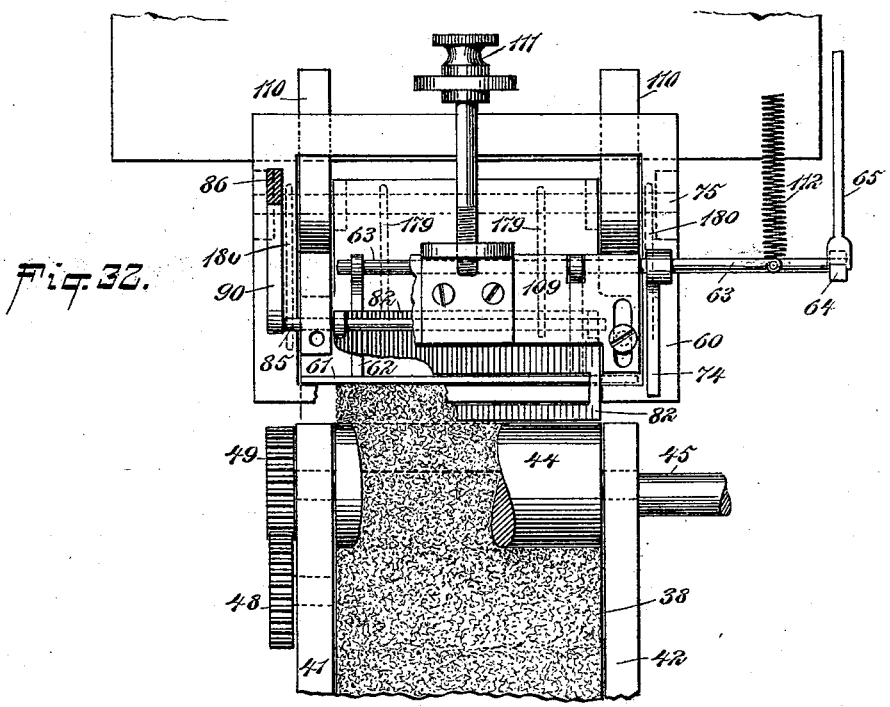
Fig. 32.
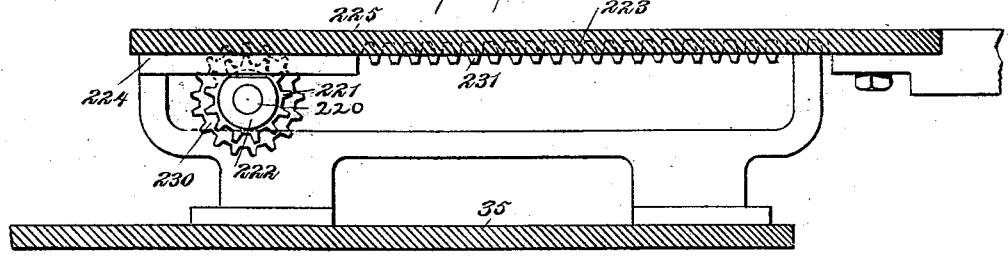
Fig. 33.
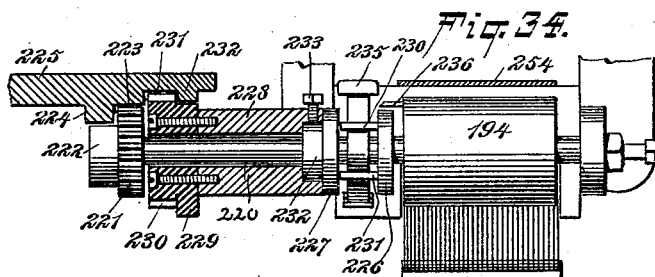
Fig. 34.
Fig. 35.
WITNESSES:
William Goebel
M. A. Gill
INVENTOR
J. R. Williams,
BY
Chas. C. Gill
ATTORNEY.

(No Model.) 18 Sheets—Sheet 18.
J. R. WILLIAMS.
MACHINE FOR MAKING CIGARETTES.
No. 521,749. Patented June 19, 1894.
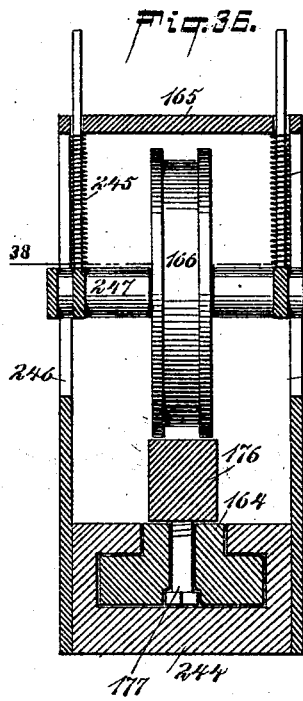
Fig. 36.
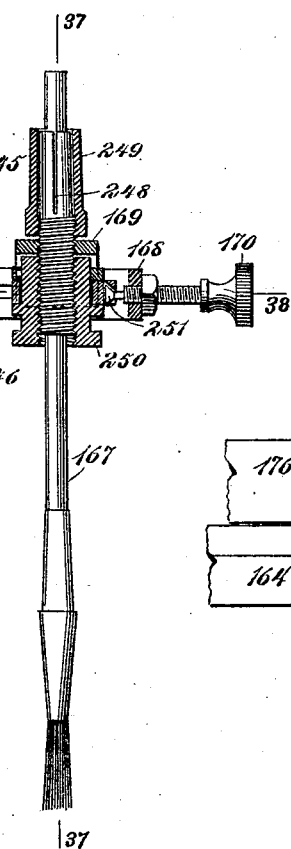
Fig. 37.
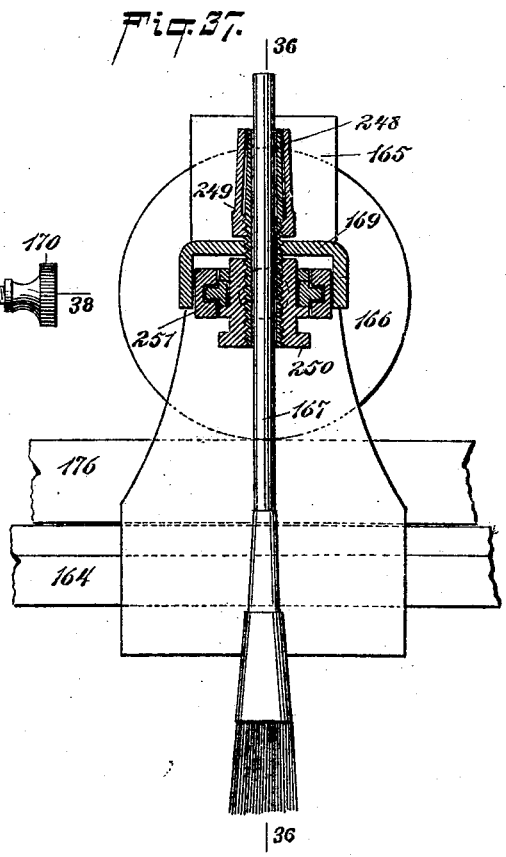
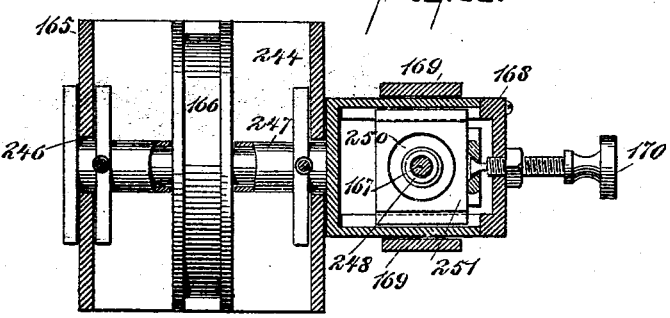
Fig. 38.
WITNESSES:
William Goebel.
M. H. Gill
INVENTOR
John R. Williams,
BY
Chas. E. Gill
ATTORNEY.

UNITED STATES PATENT OFFICE.

JOHN R. WILLIAMS, OF EAST ORANGE, NEW JERSEY.

MACHINE FOR MAKING CIGARETTES.

SPECIFICATION forming part of Letters Patent No. 521,749, dated June 19, 1894.

Application filed February 19, 1894. Serial No. 500,746. (No model.)

*To all whom it may concern:*

Be it known that I, JOHN R. WILLIAMS, a citizen of the United States, and a resident of East Orange, in the county of Essex and State of New Jersey, have invented certain new and useful Improvements in Machines for Making Cigarettes, of which the following is a specification.

The invention relates to improvements in machines for making cigarettes, and consists in the novel features and combinations of parts, with certain details of construction, hereinafter fully described and particularly pointed out in the claims.

The machine embodying the invention made the subject of this application embraces automatic mechanism for feeding the filler tobacco in bulk, severing pre-determined charges of the same and delivering said charges to a traveling shuttle which conveys the same to the rolling apron; also novel mechanism for cutting the wrappers for the cigarettes, applying paste to the edge thereof and conveying the same from the cutting mechanism to the rolling table, the wrappers being held by air suction in an even flat condition while being cut and pasted and while being carried from the cutting mechanism to the rolling apron, which also is in connection with air suction apparatus whereby the wrapper is received in its distended flat condition and so held while being rolled upon the filler tobacco for forming the cigarettes; and also novel mechanism for rolling the cigarettes and trimming the ends thereof while in the loop of the rolling apron.

The construction and operation of the various parts of the machine will be specifically described in their order hereinafter, from which description and the accompanying drawings the invention will be more fully understood.

The machine which is the subject hereof is illustrated in the operation of rolling "all tobacco" cigarettes, but I do not confine the invention in every instance to the use of a tobacco wrapper or binder, nor to the manufacture of cigarettes of any special length or diameter; nor is the invention confined to rolling what are technically known in law and commerce as cigarettes, since the filler and wrapper or binder may be of larger proportions than those required for the usual cigarettes, and under such conditions, the product will be ordinarily termed cigars or bear other trade designations.

In the drawings are shown various cams and connecting arms for imparting movement from the main driving shaft to the mechanism constituting the essential parts of the machine, but the invention is not confined to these special cams and arms and they may be varied within the skill of the intelligent mechanic.

Figure 2:
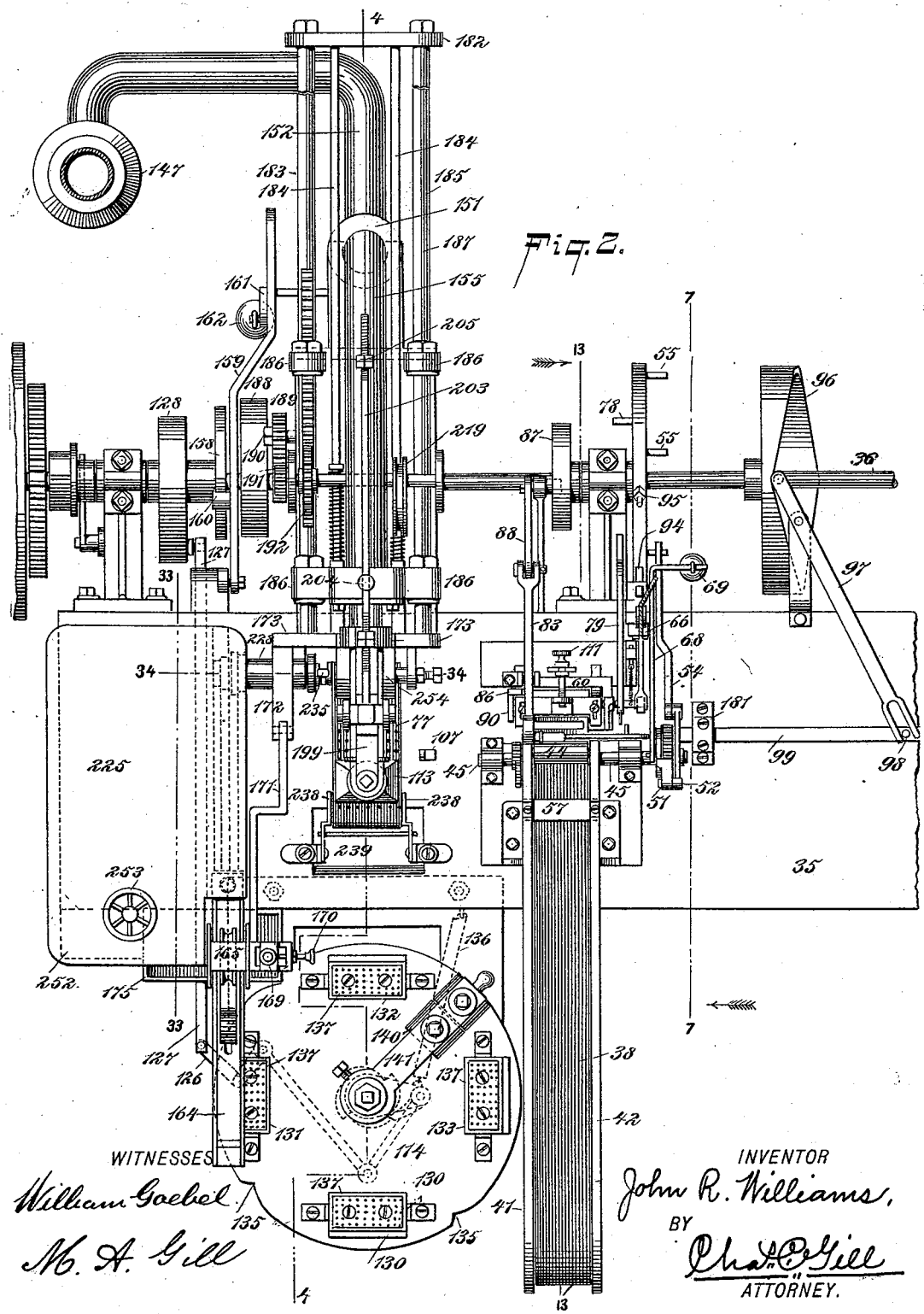
Figures 13, 14:
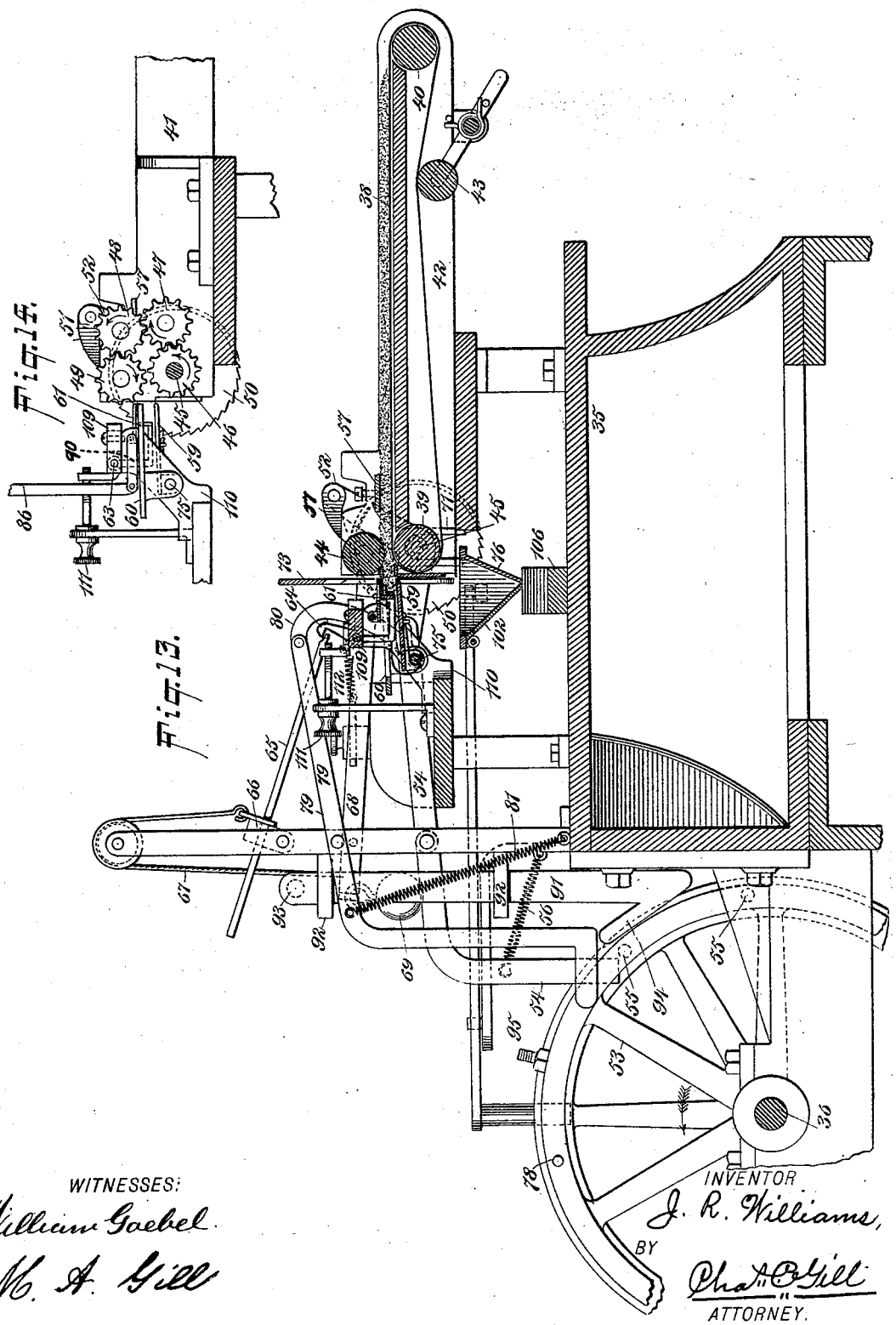
Figure 25:
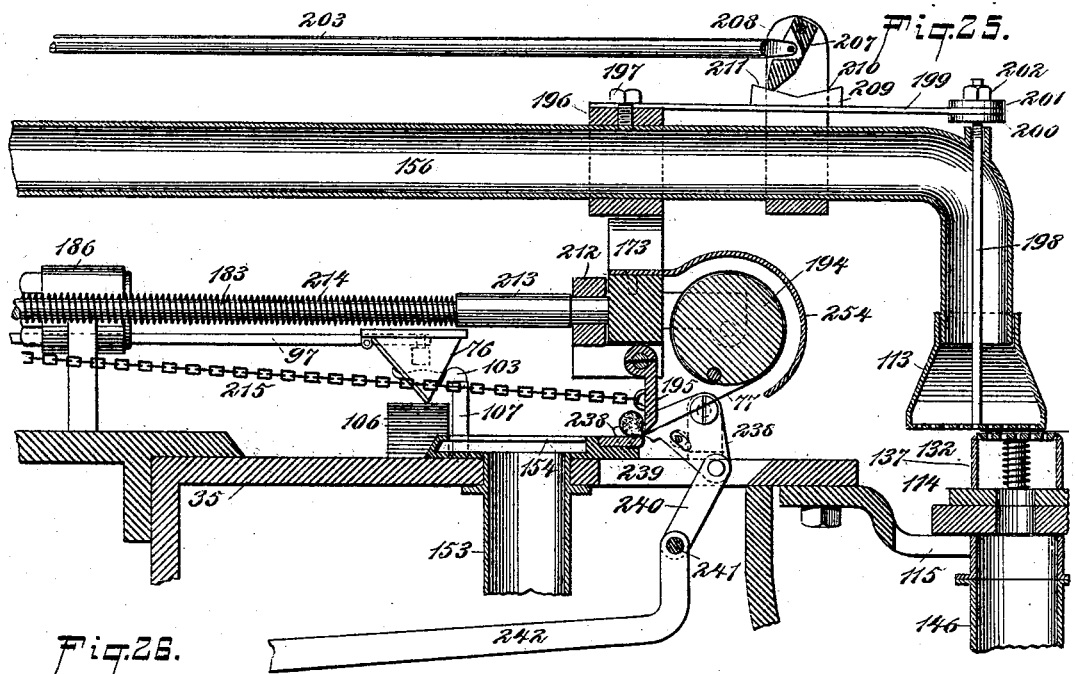
Figure 26:
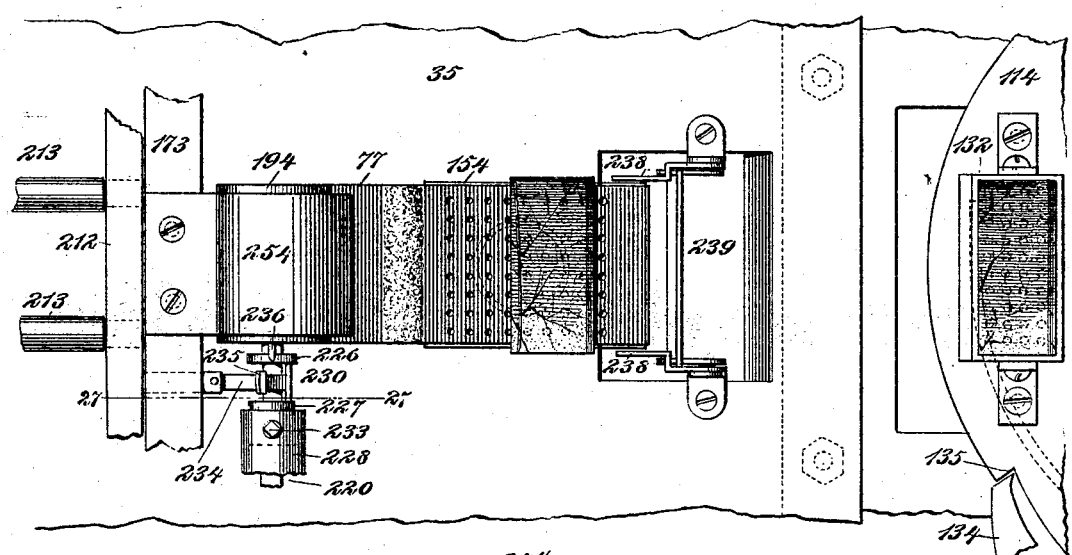
Figure 27:
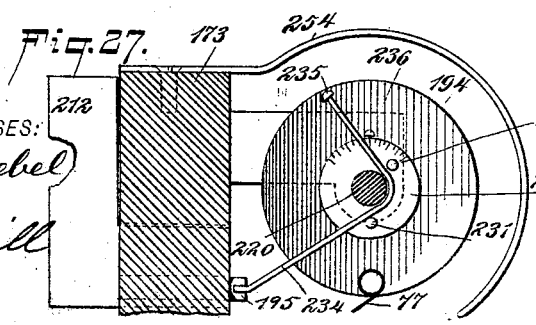

Referring to the accompanying drawings: Figure 1 is a front elevation, partly broken away, of a machine constructed in accordance with and embodying the invention. Fig. 2 is a top view, partly broken away, of same. Fig. 3 is an end view of same on an enlarged scale, this view being of the left hand end of the machine. Fig. 4 is a vertical transverse section of same on the dotted line 4—4 of Fig. 2, this view showing the reciprocating roller carrying the apron in its rear position and the pneumatic wrapper carrier as depositing a wrapper in position on said apron to receive the filler. Fig. 5 is a like section of same, but showing the reciprocating roller advancing forward, the apron rolling the cigarette toward the front of the machine, and the pneumatic wrapper carrier moving toward the wrapper table to receive a wrapper to be carried rearward on the return of the reciprocating roller toward its rearward position shown in Fig. 4. Fig. 6 is a like section of same, showing the position of the parts when the cigarette has been rolled about to the knives for trimming its ends and the pneumatic wrapper carrier has about reached the wrapper, the air suction having been cut off from the wrapper to be removed from the wrapper table and also from the perforated rolling table and turned on the pneumatic wrapper carrier, thus causing the latter to lift the wrapper released from the action of the air at the table. Fig. 7 is an enlarged vertical transverse section of same on the dotted line 7—7 of Fig. 2, looking toward the left and showing particularly the actuating mechanism for feeding the filler tobacco to the knife by which the separate charges are severed preparatory to being carried by the shuttle to the rolling apron. Fig. 8 is a slightly enlarged detached view looking at the opposite side of a portion of the feed actuating mechanism. Fig. 9 is a vertical section of same on the dotted line 9—9 of Fig. 8. Fig. 10 is a section corresponding with Fig. 7 but showing the main pawl in engagement with the ratchet, while in Figs. 7, 8 and 9, the pawl is shown as temporarily elevated from the ratchet so as to suspend the feeding of the tobacco. Fig. 11 is a view corresponding with Fig. 8 but showing the pawl in engagement with the ratchet. Fig. 12 is a vertical section of same on the dotted line 12—12 of Fig. 11. Fig. 13 is a central vertical transverse section through the feed mechanism for the filler tobacco, said section being on the dotted line 13—13 of Fig. 2. Fig. 14 is a detached side elevation, partly in section, of a portion of the feed mechanism for the filler tobacco. Fig. 15 is an enlarged top view, partly broken away, of that part of the machine comprising the feed mechanism for the filler tobacco. Fig. 16 is a detached end view of the shuttle which carries the charge of filler tobacco from the point at which it is severed from the main body of tobacco to the rolling apron, the side of said shuttle being shown open by full lines and closed by dotted lines. Fig. 17 is an enlarged top view, partly broken away, of the revoluble wrapper table and cutters. Fig. 18 is a vertical section of same on the dotted line 18—18 of Fig. 17. Fig. 19 is an enlarged side elevation, partly broken away, of that part of the machine which comprises the means for applying a line of paste along one edge of the wrapper prior to its being carried into position to be taken up by the pneumatic wrapper carrier, this figure showing the paste brush dipped into the paste receptacle and at its extreme rearward position. Fig. 20 is a like view of same, showing by full lines the paste brush on its passage forward to the wrapper and by dotted lines the said brush at its extreme forward or frontward position. Fig. 21 is a detached side elevation of mechanism for operating one of the air valves. Fig. 22 is an enlarged central vertical transverse section through the cigarette rolling mechanism and pneumatic wrapper carrier, the reciprocating roller carrying the apron being at its rear position, a charge of filler tobacco for a cigarette having been deposited on the rear part of said apron, and the pneumatic wrapper carrier having deposited a wrapper on the rear part of the said apron where it will be held by air suction from below. Fig. 23 is a face view of the end of the pneumatic wrapper carrier. Fig. 24 is a section corresponding with Fig. 22, but showing the filler tobacco in the loop of the apron and being rolled toward the wrapper. Fig. 25 is a section corresponding with Figs. 22 and 24 but showing the position of the parts when the cigarette has reached the end of its rolling movement and is having its ends trimmed, and showing also the pneumatic wrapper carrier in its forward position ready to lift a wrapper from the wrapper table. Fig. 26 is a detached top view of the rolling table and a portion of the wrapper table, the apron and its roller being in the position shown in Fig. 22. Fig. 27 is a detached section of a part of the rolling mechanism on the dotted line 27—27 of Fig. 26. Fig. 28 is an enlarged detached central vertical transverse section through the feed mechanism for the filler tobacco, said mechanism being shown in position feeding the tobacco inward against the gage plate and upon the table which receives the charge and deposits it in the shuttle. Fig. 29 is a like section of same, showing said feed mechanism thrown out of engagement with the feed rollers and the knife on its descent, the partly severed charge of filler tobacco being on its table ready to be delivered to the shuttle below it. Fig. 30 is a like section of same, showing the charge of filler tobacco completely severed. Fig. 31 is a like view of same, showing the charge of filler tobacco delivered to the shuttle and the knife returned to its upward position. Fig. 32 is a detached top view, partly broken away, of a portion of the tobacco feed mechanism and connecting parts. Fig. 33 is an enlarged vertical section through a part of the machine on the dotted line 33—33 of Fig. 2. Fig. 34 is a vertical transverse section through a part of the machine on the dotted line 34—34 of Fig. 2. Fig. 35 is a detached bottom view of a portion of a plate forming a part of the machine and bearing certain racks and tramways hereinafter referred to. Fig. 36 is a central vertical transverse section through the traveling carriage which carries the brush for applying the paste to the edge of the wrapper or binder. Fig. 37 is a vertical section of same on the dotted line 37—37 of Fig. 36; and Fig. 38 is a transverse section of same on the dotted line 38—38 of Fig. 36.

In the drawings the number 35 designates the main supporting frame of the machine, and 36 the main driving shaft, which at its end will be provided with any suitable clutch mechanism for starting and stopping the machine and adapted to be operated by a foot treadle 37 under the control of the attendant.

In the following specification will be described, first, the mechanism for feeding inward to the machine the filler tobacco, severing the definite charges of said tobacco for the cigarettes, and conveying said charges to the rolling apron; second, the mechanism for preparing the wrappers for the cigarettes, applying the paste to the edge thereof and conveying the same to the rolling apron; and, third, the mechanism for rolling the cigarette and trimming the ends thereof.

The feed mechanism is shown in Figs. 1 and 2 but is more clearly illustrated in Figs. 7 to 14 inclusive, in which figures the number 38 denotes an endless conveying belt on which the filler tobacco is placed by hand and which is mounted on the rollers 39 and 40 journaled in the sides or frames 41 and 42. Below the belt 38, as shown in Fig. 13, is pivotally mounted a tension roller 43 of well known form; and over the roller 39 is journaled the pressure roller 44, below which the filler tobacco passes. The shaft 45 of the roller 39 extends through the sides 41 and 42, and carries at its left hand end the gear wheel 46, which through the idlers 47 and 48 (see Fig. 14) and the gear wheel 49 imparts motion to the roller 44. The shaft 45 of the roller 39 receives its motion from the ratchet 50 on the right hand end thereof, which ratchet is actuated by the pawl 51 carried by the bell-crank lever 52, which is itself actuated from the main driving shaft 36 through the wheel 53 and bent lever 54, the latter being pivoted to one of the standards, as shown in Fig. 10, and having its lower end in proper relation to the wheel 53 to be met by the pins 55 thereon. As the pins 55 strike the lever 54, the upper forward end of the latter will be depressed and through the bell-crank lever 52 cause the pawl 51 to have the movement indicated by dotted lines in Fig. 10, thereby intermittently rotating the ratchet 50, roller 39, belt 38 and roller 44. As each pin 55 passes beyond the lever 54, the spring 56 restores the levers 54 and 52 and pawl 51 to their normal position, shown by dotted lines in Fig. 10. The intermittent motion of the rollers 39 and 44 and the belt 38 moves the filler tobacco at convenient stages into the machine, it being intended that with each revolution of the driving shaft 36 a sufficient quantity of the filler tobacco shall be fed inward beyond the rollers 39 and 44 to form one cigarette. By means of devices presently to be described the inward feed of the tobacco is controlled, so that should enough tobacco for the filler of a cigarette be fed inward before the driving shaft 36 has finished its revolution the rollers 39 and 44 will come to a rest and the pawl 51 will be disengaged from the ratchet 50, thus checking the movement of the belt 38 and stopping the feed of the filler tobacco. In front of the rollers 39 and 44 is provided a usual gage plate 57, below which the filler tobacco passes, and in rear of said rollers is the throat 58, see Figs. 28, 29, 30 and 31, through which the filler tobacco is fed upon the tilting table 59 and below the open plate or frame 60 and against the sensitive gage plate 61, which by means of arms 62 is secured to the rock-shaft 63, upon whose right hand end is fastened the hooked trip arm 64 adapted to engage the rod 65, which, as shown in Fig. 10, is secured in the pivoted bearing 66 and has a normal tension upward from the arm 64 owing to the connection of the cord 67, pivoted arm 68 and weight 69, the latter being secured to the arm 68 and through said arm and cord exerting an upward pull against the bearing 66 and rod 65. The weight 69 only acts to throw the rod 65 and arm 68 upward when the shaft 63 has been rocked toward the front sufficiently to free the trip arm 64 from engagement with said rod 65. When the arm 64 and rod 65 are disengaged and the weight 69 elevates the said rod and the arm 68, the front end of the latter, acting through the pin 70 (see Figs. 8, 9, 11, and 12) will raise the segment 71 and elevate the pawl 51 free of the ratchet 50 (as shown in Fig. 8) at which time the motion of the pawl 51 due to the wheel 53, arm 54 and bell-crank lever 52, will have no effect on the ratchet 50 and the rollers 39 and 44 and feed belt 38 will remain at rest. The rock-shaft 63 will be moved to free the trip arm 64 from the rod 65 either by the pressure of the filler tobacco against the gage plate 61 or by the lug 72 on the cutting knife 73 coming into contact during the regular descent of the knife with the arm 74 extending forward from the said shaft 63.

The table 59 and open frame 60 are carried by but are loose on the shaft 75, and are supported in correct position, as shown, by the springs 179 and 180 respectively, which are rigidly fastened to said shaft 75; and after the severing of the charge of filler tobacco the said table and frame are turned downward, as shown in Fig. 31, to deposit the said charge into the movable shuttle 76, by which, as hereinafter described, the charge is conveyed to the rolling apron 77. The table 59 and plate 60 are turned downward to deliver the charge of filler tobacco to the shuttle 76, by the action of the driving shaft 36 operating through the wheel 53 and pin 78 thereon to rock the bent lever 79 and thus through the link 80 to rotate the shaft 75 and turn the springs 179 and 180 and through said springs the table 59 and open plate 60 downward. After the pin 78 on the wheel 53 has passed from contact with the lever 79, the spring 81 will restore the said lever with its connecting parts to their previous normal position, thus elevating the table 59 and plate 60 to their horizontal position in line with the throat 58 preparatory to receiving another charge of filler tobacco.

Above the plate 60 is pivotally mounted the plate 82, which prevents the filler tobacco from riding upward during the feeding operation instead of pressing against the plate 61; and this plate 82 is normally in a horizontal position, as shown in Fig. 28, but turns upward, as shown in Figs. 29 and 30, when the knife 73 descends so as to get out of the way of the knife. When the knife 73 ascends, the plate 82 again turns downward to its horizontal position, and the movement of the plate 82 is effected from the rocking lever 83 which operates the knife bar 84 and is connected with the bearing shaft 85 of said plate 82 by means of the rod 86 and crank arm 90 which, as the knife 73 descends, will turn said plate upward, and return said plate to its horizontal position when the knife ascends. The lever 83 connected with the knife bar 84 is operated from the main driving shaft 36 through the medium of the cam 87 thereon and the rod 88 intermediate said cam and lever. The knife 73 is of ordinary form pivoted at one end and at the other connected with the bar 84; and said knife in use co-operates with the ordinary lower stationary knife or cutter 89. The descent of the knife 73 operates to sever that portion of the filler tobacco on the table 59 from the main body of the tobacco, thus forming a charge for one cigarette and leaving the same on the table 59 above described. The table 59 has below it the springs 179 and the frame or open plate 60 has below it the springs 180, and these springs 179 and 180 are fast at their rear ends to the shaft 75 but at their front ends enter eyes 181 on the said table and plate so as to be held in position and adapted on the turning of the shaft 75 to pull the table and plate downward to the position shown in Fig. 31 or, on the reversal of the motion of said shaft, to lift said table and plate to the position shown in Fig. 28. The springs 179 afford a yielding support to the table 59, and thus permit a pivoted knife 73 to be used. The knife 73 being pivoted does not descend at once across the full width of the body of filler tobacco, and hence the table 59 is made to yield under the pressure of the knife 73 until the latter has completed its downward stroke and severed the charge of tobacco for a cigarette, as shown in Fig. 30, after which the knife 73 ascends as usual and the springs 179 restore the table 59 to its horizontal position, while the plate or frame 60 prevents the severed charge of filler tobacco from sticking to or being carried upward by the knife 73 during the ascent of the latter. As soon as the knife 73 has made its ascent, the shaft 75 is, by the means above described, rotated to cause the springs 179 and 180 to pull the table 59 and open plate or frame 60 downward, as shown in Fig. 31, to drop the severed charge of filler tobacco into the shuttle 76. There is a difference in the tension of the springs 179 and 180, the latter being a little the stronger and hence during the turning downward of said table 59 and plate or frame 60 the former will move a little in advance of the latter, thus widening the space between their front or holding portions, as shown in Fig. 31, and allowing the severed charge of filler tobacco to freely escape to the shuttle 76.

It has been described above that the pressure of the tobacco passing through the throat 58 and against the plate 61 will operate when the requisite degree of pressure has been brought to bear against said plate 61, to rock the shaft 63 and tilt the trip-arm 64 from contact with the end of the rod 65, thereby permitting the weight 69 to throw the said rod 65 upward and through the lever arm 68 to elevate the segment 71 to a position which will free the pawl 51 from the ratchet 50 and thereby prevent the rotation of said ratchet 50 and stop the feeding of the filler tobacco.

The machine also comprises mechanism by which after the charge of tobacco for the filler of a cigarette has been deposited by the table 59 into the shuttle 76, to reset the trip-arm 64 and rod 65 and effect the re-engagement of the pawl 51 with the ratchet 50 in order that during the continued motion of the mechanism the filler tobacco may be fed inward on its belt 38, until a sufficient pressure of the tobacco has been again exerted against the plate 61 to cause a further disengagement of the arm 64 from the rod 65. The mechanism for resetting the arm 64 and rod 65 is illustrated in Fig. 10, in which it will be observed that at the rear of the main supporting table or frame 35 of the machine is provided the vertically reciprocating slide 91, which is housed in guides 92 and carries at its upper end the transverse pin 93, while at its lower end the said slide 91 has an upwardly turned inclined extension 94, whose lower surface is in line with the periphery of the wheel 53 and is in juxtaposition thereto. Upon the periphery of the wheel 53 is secured a stud 95 of any suitable description which as the wheel 53 revolves will come into contact with and elevate the slide 91 in order that the transverse pin 93 at the upper end thereof may be forced into contact with the rear end of the rod 65 and thereby cause said rod to be moved with its pivotal bearing 66 until the front end of the rod has been forced downward into a position to engage the upper end of the trip-arm 64. The upward movement of the slide 91 against the rod 65 to effect the lowering of the front end of said rod causes, through the cord 67, the rear end of the lever 68 with the weight 69 to be elevated, thereby lowering the front end of said lever 68 and causing the depression of the segment 71 and the re-engagement of the pawl 51 with the ratchet 50. With each revolution of the driving shaft 36 and wheel 53 enough tobacco is or should be fed through the throat 58 and upon the table 59 to form the filler of one cigarette, and hence with each revolution of the shaft 36 this charge of tobacco on the table 59 is severed and deposited into the shuttle 76; and the trip-arm 64 and rod 65 are first disengaged by the pressure of the tobacco on the plate 61 and then re-engaged by the action of the stud 95 on the wheel 53 coming into contact with and elevating the vertical slide 91 against the rear end of the rod 65.

The rock shaft 63 above described is mounted in the transverse block or frame 109, which is secured to the upper ends of the standards 110 by means of the screws which enter slots formed in said block or frame, as shown in Fig. 15, and which permit of a longitudinal adjustment of the said block or frame on the standards 110 for the purpose of regulating the relation of the plate 61 with the vertical plane of the knife 73. The longitudinal adjustment of the block or frame 109 is effected by first loosening the screws securing it to the standards 110 and then operating the set screw nut 111, which will have the effect of moving the said frame 109 either toward the front or the rear of the machine in accordance with the direction of the rotation of said nut 111. After the block or frame 109 has been adjusted to the proper position, it will be again rigidly fastened by means of the screws, which secure it to the standards 110.

The adjustment of the block or frame 109 beyond certain limits would necessitate a like adjustment of the rod 65 in its pivotal bearing 66, in order that a due relation of the upper end of the arm 64 with said rod 65 might be preserved. The relation of the plate 61 with the vertical path or plane of the cutter 73 will regulate the quantity of filler tobacco to be severed for each cigarette, the adjustment of the block 109 toward the knife 73 resulting in a contracting of the space to receive the filler and limiting the quantity of tobacco for the separate charges; while, when the block 109 is by means of its adjusting screw moved rearward the space between the plate 61 and the vertical plane of the knife 73 is increased and the charges of filler tobacco for the cigarettes will likewise be increased in quantity. The rock shaft 63 mounted on the block 109 is given a tension toward the rear of the machine by reason of the spring 112, which preserves the relation of the arm 64 with the rod 65 and returns said arm to its normal position, illustrated in Fig. 28, after said arm has been moved toward the front for the purpose of freeing the rod 65.

It has been described above that the quantity of tobacco passing through the throat 58 upon the table 59 and against the plate 61 regulates the feed, in that when a sufficient pressure of said tobacco is exerted against the said plate 61 it will tilt the arm 64 to free the arm 65, resulting in a stoppage of the feeding apron 38, and that at each revolution of the driving shaft 36 one charge of the tobacco is severed by the knife 73 and deposited into the shuttle 76 by which it is conveyed to the rolling apron. It is to be noted, however, that if for any reason during the complete revolution of the driving shaft 36 enough tobacco has not entered upon the plate 59 to create the requisite pressure against the plate 61 to tilt the arm 64, the stud 72 on the knife will come into contact with the arm 74 connected with the rock shaft 63 and tilt the arm 64, thus insuring the tilting of the trip-arm with each revolution of the driving shaft 36 even though from some accidental cause enough tobacco has not reached the table 59 to create the requisite pressure on the plate 61 to rock the shaft 63.

In the foregoing description have been presented full explanations of the construction of that part of the machine comprising the mechanism for feeding the filler tobacco, severing the same into pre-determined charges and depositing said charges into the shuttle 76 by which the charges one after another are conveyed to the rolling apron in the manner hereinafter to be described.

In the operation of the machine the tobacco will be spread upon the belt 38 by hand and allowed to be fed forward under the action of the rollers 39 and 44, the gage plate 57 preventing any undue accumulation of tobacco from passing to the said rollers 39 and 44. The movement of the rollers 39 and 44 is effected from the main driving shaft 36 through the wheel 53, pins 55 thereon, lever 54, bell crank lever 52, pawl 51 and ratchet 50, the latter being on the shaft 45 and having its motion communicated to the roller 44 through the medium of the gear wheels 46, 47, 48 and 49. The ratchet 50 controls the extent of the feed of tobacco and this ratchet has an intermittent motion communicated to it by the contact of the pins 55 with the lever 54, and hence in the construction of the machine care will be taken simply to provide enough of the pins 55 on the wheel 53 to insure only such movement in the lever 54 and ratchet 50 as will be necessary for the feeding of a single charge of tobacco through the throat 58 with each complete revolution of the wheel 53 and shaft 36. With each revolution of the wheel 53 the pin 78 thereon will come into contact with the bent lever 79 and tilt the table 59 downward to discharge the filler tobacco thereon into the shuttle 76. The wheel 53 during each complete revolution of the driving shaft 36 performs three functions, as follows: First, the pins 55 on the right hand side of the wheel 53 are brought into contact with and operate the bent lever 54, whereby, through the bell-crank lever 52, pawl 51 and ratchet 50, enough of the filler tobacco is fed upon the plate 59 and against the plate 61 to constitute the filler for a single cigarette; second, the pin 78 on the left hand side of the wheel 53 is brought into contact with the bent lever 79 and through the connecting link 80 operates to dump the table 59 downward to discharge the said filler tobacco for a cigarette into the shuttle 76; and, third, the stud 95 on the periphery of the wheel 53 elevates the slide 91 and re-sets the trip-arm 64 and rod 65 and at the same time effects the re-engagement of the pawl 51 with the ratchet 50, thus restoring the feeding mechanism into a condition in which the tobacco will be again fed inward until the pressure thereof against the plate 61 has become sufficient to again free the arm 64 from the rod 65, when, as above described, the motion of the belt 38 and rollers 39 and 44 will be discontinued. The quantity of the tobacco fed inward between the rollers 39 and 44 and upon the table 59 is regulated by the pressure of the tobacco against the plate 61 which operates as a gage, and when enough of the tobacco has passed upon the table 59 to create the requisite pressure, the said plate 61 through its arms 62 will rock the shaft 63 and free the rod 65 from the arm 64, thus stopping the feed.

The timing of the machine is such that the feeding inward of the charge of tobacco upon the table 59 will take place before the descent of the knife 73 under the action of the cam 87, that the knife 73 will operate before the pin 78 actuates the lever 79 and arm 80 to tilt the table 59, and that, after the operation resulting from the pin 78 coming into contact with the bent lever 79, the stud 95 will restore the lever 68 and rod 65 to their normal positions, resetting the feed mechanism into a condition in which the tobacco will immediately begin to feed forward as soon as any of the pins 55 come into contact with the lower end of the bent lever 54.

Upon the driving shaft 36 at the right of the wheel 53 is provided the cam 96 which engages the short arm of the pivoted lever 97, whose longer arm extends upon the main frame or table 35 and is slotted to receive the pin 98 secured upon the reciprocating rod 99, which is mounted in slightly elevated ways 181 (Figs. 1 and 2) and carries at its left hand end the shuttle 76 and is provided at its right hand end with the chain 100 and weight 101, the effect of the latter being to create a constant tension toward the right on the rod 99 and thereby through the pin 98 to retain the short arm of the lever 97 against the edge of the cam 96 in order that the outline of said cam 96 may absolutely control the extent of the movement of the rod 99 and shuttle 76. The shuttle 76 is of a triangular shape in cross section and is provided at one side with the hinged door 102 which is normally kept closed by the pivoted weighted catch 103 engaging a notch therein, as illustrated more clearly in Fig. 16. The engagement of the catch 103 with the notch 104 in the door 102 is effected partly by the fact that the said catch is weighted and partly by the action of the spring 105 which creates an upward tension at the smaller or engaging end of said catch. The shuttle 76 will be of convenient size to receive the filler tobacco for a single cigarette and has no further function than under the action of the cam 96 to slide over the table and carry the charge of tobacco to the rolling apron 77, upon reaching which the weighted end of the catch 103 comes into contact with a projecting elevation 107 as shown in Figs. 2 and 16, which elevates said end of the catch 103 and frees the door 102, allowing the latter to open, and the charge of filler tobacco to fall upon the said apron 77. With each revolution of the driving shaft 36 and cam 96, the rod 99 and shuttle 76 make one complete movement from their normal position shown in Fig. 2 to the apron 77, where the charge of tobacco is dropped, and back to their normal position, the shuttle at such latter time being directly below the table 59 and in position to receive the succeeding charge of filler tobacco therefrom. The door 102 is hinged to the frame of the shuttle 76 so as to freely open, when released, to the inclined position shown in Fig. 16, and said door 102 during the latter part of the return movement of the shuttle 76 to its normal position meets and in riding up the incline 106 closes to the position shown by dotted lines in Fig. 16. The incline 106 is shown in Fig. 1 and also in Figs. 7, 22, 24 and 25.

The mechanism for cutting the wrappers, applying the paste thereto and moving them to position to be taken by the pneumatic wrapper carrier (numbered 113) are shown more clearly in Figs. 1, 2, 3, 17, 18, 19 and 20, in which 114 denotes the wrapper table which is in the form of a disk resting upon the hollow stationary frame 115, and is mounted on and fastened by a screw 116 (see Fig. 18) to the vertical spindle 117 which extends centrally through said frame 115 and table 114 and carries at its lower end the ratchet 118 whose sleeve 119 is fastened to said spindle 117 by a screw 120. The lower end of the spindle 117 also carries the pawl arm 121 which at its inner end encircles the sleeve 119 of the said ratchet 118 and is adapted to move thereon. The arm 121 carries the pawl 122 and is connected with the jointed arms 123, 124, 125 and 126, the latter being connected with the rod 127 which extends rearward and is engaged by the cam 128 secured on the main driving shaft 36. The rear end of the rod 127 carries a small roller, as shown in Fig. 2, which enters the rim of said cam 128, the purpose of the latter being to impart during the revolution of the shaft 36 a reciprocating motion to the rod 127, which, owing to said reciprocating motion actuates the jointed arms 121, 123, 124, 125 and 126 to impart the proper movement to the pawl 122 to rotate the ratchet 118 and with it the spindle 117. In the present instance owing to the fact that there are four wrapper cutters, numbered 130, 131, 132 and 133, respectively, on the disk or table 114, there are four teeth in the ratchet 118, the purpose being through the said ratchet and the connecting arms to impart during one revolution of the driving shaft 36 a one-quarter turn to the table 114. The arms 121, 123, 124, 125 and 126 and rod 127 form a convenient means for rotating the spindle 117 and table 114 from the driving shaft 36, but the invention is not limited to any special form of arms for imparting movement from the driving shaft 36 to said spindle 117. In order that there may be no back movement of the table 114 at the end of each quarter revolution thereof there has been provided the spring pawl 134, which engages the rim of the said table 114 and enters at the end of each quarter revolution the notches 135 provided in said table; and in order to insure steadiness of motion in the arms 121, 123, 124, 125 and 126 a spring 136 has been provided, against the tension of which the said arms pull during the rotation of the ratchet 118 and spindle 117. Upon the table 114 there are provided, as above described, four wrapper cutters 130, 131, 132 and 133, respectively, and these cutters each consists of a die 137 in the outline of the wrapper to be cut and containing the perforated platen 138 mounted upon springs 139 so as to yield to the thickness of the wrapper being cut and the action of the rollers 140 secured to the arm 141 which is mounted upon the upper end of the spindle 117. The inner end of said arm 141 has a sleeve 142 which encircles the spindle 117 and insures a free oscillating motion of the rollers 140 under the action of the arm 141 when the latter is operated by hand to cause the rollers 140 to travel across the dies 137 upon which the leaf, as illustrated in Fig. 17, will be placed. The wrapper cutters 130, 131, 132 and 133 and the swinging arm 141 carrying the rollers 140 are not specifically claimed herein and are shown and described in Letters Patent of the United States heretofore granted to me on the 26th day of March, 1889, and numbered 400,153.

The frame 115 upon which the table 114 is mounted contains the compartments 143 and 144 separated by a partition 145, the compartment 143 being directly in line with the rolling apron 77 and being connected with the pipe 146 leading to the vacuum chamber 147, the latter being by means of a pipe 148 connected to the air suction apparatus of any suitable description. The compartment 144 of the frame 115 is connected by a pipe 149 with the vacuum chamber 147 and has no connection with the pipe 146. The air suction is utilized to maintain the leaf while the wrappers are cut therefrom in a smooth even condition upon the dies 137, and also to maintain the wrappers after they are cut in a smooth even condition while the row of paste 150 (see Fig. 17) is applied thereto and until the pneumatic wrapper carrier 113 has engaged said wrapper and is prepared to remove the same from the die and convey it to the rolling apron 77.

As may be seen from Fig. 17 the cutting of the wrappers is accomplished at the front edge of the table 114, the paste is applied to the cut wrappers at the left hand side of said table, and at the inner or rear edge of said table the cut wrappers are removed by the wrapper carrier 113 and conveyed to the rolling apron; while at the right hand side of the said table 114 the die 137 is idle. Owing to the fact that the table 114 has a quarter revolution with each revolution of the driving shaft 36 the wrapper cut by the cutter 130 will with the quarter revolution of the table 114 be conveyed to the position occupied in Fig. 17 by the cutter 131, and during this one-quarter revolution, the cutter 131 after its wrapper has received the row of paste 150 will be conveyed to the position occupied in Fig. 17 by the cutter 132; during the same one-quarter revolution the cutter 132 will move with the table from the position it occupies in Fig. 17 to the position of the cutter 133, and the idle cutter 133 will move to the present position of the cutter 130, where it will be brought under the influence of the air suction in the chamber 144 and be prepared to receive the tobacco leaf in order that a wrapper or binder may be cut therefrom by the motion of the arm 141 and rollers 140. The chamber 144 of the frame 115 extends from the partition 145 to a point below the right hand edge of the cutter 130, and hence it will be observed that the air suction from the pipe 149 will be constantly exerted upon the wrapper while being cut by the die 130 and upon the cut wrapper when the die 130 has traveled to the left to the position occupied by the die 131 in Fig. 17. During the rotation of the table 114 the air suction will not leave the wrapper until the latter has reached the position of the die 132 in Fig. 17 and the carrier 113 is ready to immediately elevate the wrapper from its cutter. When the air suction is turned upon the pneumatic wrapper carrier 113 to elevate the wrapper from its die, the air suction will at the same moment be cut off from the pipe 146 so as to release the said wrapper and permit the said suction within the carrier 113 to elevate the same. Owing to the fact that the suction must be relieved from the pipe 146 when turned upon the carrier 113 the pipes 146 and 149 must be separated from each other, and hence there has been provided the partition 145 separating the compartments 143 and 144. The effect of the partition 145 is to permit the cutting off of the suction from the pipe 146 without affecting the suction in the compartment 144 and pipe 149, it being intended that the suction through the pipe 149 shall be constant in order that the wrappers may be firmly held upon the cutters at all times while said cutters are over the compartment 144. The cutter 133 at the right hand side of the table 114 is not in connection with the air suction apparatus but as soon as the table 114 travels sufficiently to bring the cutter 133 over the compartment 144 it will come under the influence of the air suction and be enabled to hold the leaf while the wrapper is cut therefrom.

While four cutters numbered 130, 131, 132 and 133 have been provided on the revoluble table 114, I do not limit the invention to the employment of any special number of cutters on said revoluble table.

The pipe 146 connected with the compartment 143 extends rearward below the machine and by means of a box-joint 151 is connected with the pipe 152 which leads directly to the suction chamber 147; and the said pipe 146 is provided with a branch pipe 153 which extends upward and communicates with the slotted or perforated rolling table 154 which supports the apron 77, said apron being at its front portion also perforated as shown in Fig. 26 in order that the air suction may act upon the wrapper placed thereon to receive the filler for the cigarette. The slotted or perforated rolling table 154 and the perforated apron 77 are substantially the same as the like named elements shown and described in Letters Patent of the United States No. 504,768, granted to John R. Williams September 12, 1893, and are employed for the purpose of holding the wrapper smooth and even as described in said patent. At the box-joint 151 connecting the pipe 146 with the pipe 152 as shown in Figs. 4 and 5 is also jointed the pipe 155 which extends over the top of the main frame of the machine and receives in a telescopic manner the rear end of the hollow arm or tube 156 which extends forward toward the front of the machine and carries at its lower downwardly extending end the pneumatic wrapper carrier 113, whose lower face is perforated and of an outline adapted to hold by means of the air suction the wrappers cut on the cutting table 114. Within the box-joint 151 is provided the double acting valve 157 which as illustrated in Figs. 4 and 6, is adapted to close either the pipe 155 or the pipe 146, but not both of said pipes, so that the air suction through the pipe 152 can act either upon the wrapper carrier 113 through the pipes 155 and 156 or upon the compartment 143 through the pipe 146, the purpose of this double acting valve intermediate the said pipes 146 and 155 being to cut off the air suction from the compartment 143 at the moment the wrapper carrier 113 is in position to immediately lift the wrapper from the cutter over said compartment, thus releasing the wrapper from the cutter and permitting the air in the carrier 113 to take it therefrom preparatory on the rearward movement of the pipe 156 to carrying it to and depositing it upon the perforated apron 77. When the pneumatic carrier 113 has traveled rearward from the position shown in Fig. 6 to the position shown in Fig. 4 the valve 157 will cut off the air from the pipe 155 as shown in Fig. 4, thus releasing the wrapper from the carrier 113 and at the same time the operation of the valve 157 will open the pipe 146 with its branch 153 to the action of the air suction, which operating through the said pipes will hold the leaf upon the perforated rolling apron 77 smoothly and also hold the wrapper then brought over the compartment 143 by the table 114. The valve 157 will receive its movement from the main driving shaft 36 through the medium of the cam 158 on said shaft, the pivoted rod 159 having a roller 160 in engagement with the edge of said cam 158 and the intermediate link arms 161 extending from the rod 159 to the pivot of said valve 157, as illustrated in Figs. 3 and 21. The link arms 161 carry the weight 162 which operates to retain the roller 160 upon the edge of said cam 158, during the revolution of the driving shaft 36; when the elevated portion 163 of the cam 158 is moving below the roller 160, the rod 159 will be elevated and this action through the link arms 161 will turn the valve 157 downward to close the pipe 146 with its branch pipe 153; and when the elevated portion 163 of said cam has passed from contact with the roller 160 the rod 159 will lower and through the link arms 161 turn the valve 157 upward to the position illustrated in Fig. 4.

The mechanism by which the pneumatic wrapper carrier 113 with its pipe connection 156 is operated to travel from the wrapper cutting table 114 to the perforated rolling table 154 will be explained in full hereinafter in connection with the mechanism by which the cigarette is rolled.

At the left of the revoluble wrapper cutting table 114 is provided the means by which the row of paste 150 is applied to the wrapper at the time said wrapper has moved to the left, as indicated in Fig. 17, and is held by the action of the air suction operating through the pipe 149 and the compartment or chamber 144. The mechanism for applying the paste is shown more clearly in Figs. 2, 19, 20, 36, 37 and 38, in which it will be observed that a rail or tramway 164 is provided upon which the carriage 165 having a roller 166 and carrying the brush 167 travels. The carriage 165 is a bifurcated frame whose opposite sides extend downward upon opposite sides of the tramway 164 and carry between their lower ends the grooved block 244 (Fig. 36) which fits and is adapted to slide upon the rail 164. Between the sides of the frame 165 is the roller 166 which contacts with the upper surface of said tramway 164, and is held down upon said tramway by the springs 245 bearing upon the ends of the axle 247 of said roller, which axle is suitably journaled in vertical slots 246 to permit the roller 166 to have a vertical movement when riding over the block 176 hereinafter referred to. At the right hand side of the carriage 165 is provided the frame 168 which is connected to and moves vertically with the axle 247 and supports the three-sided plate 169 and screw 170, the latter being for the purpose of securing the lateral adjustment of the brush 167 with respect to the edge of the wrapper on which the paste is to be applied. The handle of the brush 167 extends upward through the externally threaded tube 248, which is fastened to the frame or plate 169 and receives above said plate the internally threaded sleeve 249 and below said frame the adjusting thumb-screw 250, by which the plate 169, brush 167 and sleeve or tube 248 are rendered adjustable vertically. The revoluble screw or threaded sleeve 250 has retained upon it the block 251 which has side ribs engaging grooves in the inner opposite sides of the frame 168, as shown in Fig. 37 and is adapted to be moved toward or from the frame 165 and carry the screw 250 and brush 167 with it, thereby to attain the lateral adjustment of the brush, which is effected by the set screw 170 passing through the front end of the frame 168 and having its inner reduced end seated in a recess in said block 251. The carriage 165 has a traveling movement along the tramway 164 imparted to it by the rod 171 which is pivoted to the arm 172 (see Fig. 2) connected with the transverse bar 173 forming a part of a reciprocating frame hereinafter referred to. The receptacle for containing the paste is designated by the number 175 and is in position to receive the brush 167 when the latter is at its extreme movement toward the rear of the machine and is in line with the wrapper cutter at the left hand side of the revoluble table 114. Upon the tramway 164 is provided the freely sliding block 176 having inclined ends and retained upon the tramway by screws 177 which pass freely downward through the elongated slots 178 formed in said tramway. The motion of the brush 167 may be understood by reference to Figs. 19 and 20 in which (see Fig. 19) the extreme rearward position of the brush 167 is shown, the brush at this time being immersed in the paste of the receptacle 175 and the roller 166 being directly upon the tramway 164. Upon the forward movement of the rod 171 and carriage 165 toward the table 114 the roller 166 will at first bear against the rear inclined end of the block 176 and push said block frontward a distance equal to the length of the slots 178 without riding upon said block, the effect of this action being to cause the bristles of the brush to move through the paste and be wiped against the edge of the paste receptacle 175 prior to the time when the said brush will commence to travel over the table 114. After the block 176 has been pushed along until its screws or pins 177 have reached the front end of the slots 178, the said block can have no further forward movement and the motion of the pivoted arm 171 continuing, the roller 166 will ride up the rear inclined end of the block 176 and thereafter travel along the upper surface of said block, thus compressing the springs 245 and elevating the brush 167 above the horizontal plane of the cutter 131, upon arriving over which, the roller 166 will start to descend the inclined front end of the block 176 and in doing so its weight will push the block 176 rearward a distance equal to the length of the slot 178 and cause the brush 167 to lower directly upon the wrapper held upon said cutter 131. The continued forward movement of the rod 171 and carriage 165 will cause the brush thus lowered upon the wrapper to move along the latter (and leave a line of paste 150 thereon, as illustrated in Fig. 17) until the said carriage 165 has attained its extreme position illustrated in Fig. 20, by dotted lines. Upon the return movement of the rod 171 and carriage 165, the brush 167 returns along and smooths the line of paste 150 on the wrapper held by the cutter 131 and then rides upon the block 176 until the rear end of said block has been reached, at which time the roller 166 will travel down the said block and cause the brush 167 to descend directly into the paste receptacle 175. The operation of the mechanism of the brush 167 is first to wipe the bristles against the edge of the receptacle 175, then to elevate the brush and cause it to travel directly over the wrapper on the cutter 131, then to permit the descent of the brush directly upon the rear end of said wrapper; then to move the brush along the edge of the wrapper toward the front and then to the rear of same, and then to elevate the brush again and cause it to travel over and descend into the paste receptacle 175. This motion of the brush 167 takes place with every forward movement of the mechanism of rolling a cigarette and with every quarter revolution of the table 114 carrying a fresh wrapper to the left in position to receive the row of paste 150. The brush 167 may be adjusted laterally, so as to leave the row of paste on the wrapper in just the desired position, by means of the screw 170, which can move the block 251 toward or from the frame 165; and said brush 167 may be adjusted vertically by means of the screw 250, which when rotated will elevate or lower the threaded tube 248 and plate 169 and consequently raise or lower the brush 167, which is held in said tube 248 by means of the screw-sleeve 249 acting as a clamp to compress the opposite sides of the upper split end of the tube inward against the brush handle. The finer vertical adjustment of the brush 167 to regulate the pressure of the latter on the leaf or wrapper and with respect also to the condition of the paste in the receptacle 175 will be effected by the screw 250, but any coarse adjustment of the brush in a vertical direction may be accomplished by hand by simply loosening or removing the sleeve or screw 249, moving the brush in the sleeve 248 and re-tightening or re-placing the screw 249. The paste receptacle 175 is an ordinary shallow box resting on a plate 252 (see Figs. 1 and 2) which may be given a vertical movement in a usual manner to regulate the elevation of the box by an ordinary hand screw 253. The invention is not of course limited to any special form or arrangement of paste box nor to an adjustable box or receptacle.

The mechanism for actuating the pneumatic wrapper carrier 113, rolling and trimming the ends of the cigarette and regulating the size of the loop or bight in the rolling apron 77 will now be described.

In rear of the rolling table 154 and rolling apron 77 is secured a reciprocating frame composed of the end cross-heads 173 and 182 (see Figs. 2 and 3) and the rods 183, 184 and 185 which connect said cross-heads. The rods 183 and 185 are supported in the stationary sleeves 186 and move therein during the reciprocation of the frame of which they form a part and which for convenience may be designated as frame 187. The frame 187 receives its reciprocating motion from the main driving shaft 36 and the cam 188 thereon through the rocking toothed segment 189 (Fig. 3) pivoted at 190, the pinion wheel 191 engaging said segment, and the pinion 192 which is mounted on the same shaft with the pinion 191 and engages the rack 193 formed on the rod 183. During the revolution of the shaft 36, the cam 188 engages the segment 189 and turns the same on its pivot 190, and thus causes said segment to rotate the gear wheels 191 and 192, the result being that the wheel 192 will engage the rack 193 and cause the frame 187 to travel back and forth or reciprocate in the sleeves 186. The frame 187 with each revolution of the driving shaft 36 travels forward from the position shown in Figs. 2, 3 and 22 to the position shown in Fig. 24 and then back to the position shown in Figs. 2, 3 and 22. The lower end of the segment 189 carries an ordinary stud which enters within the rim of the cam 188 in the well known manner so that the cam may control the movement of the segment. The frame 187 is simply a carrying frame, and with it moves the pipe 156, and pneumatic wrapper carrier 113, the roller 194 holding one end of the rolling apron 77, and the blade 195, which effects the necessary pressure on the tobacco while being rolled. The cross-head 173 is constructed with the bridge 196 centrally within which by means of a screw 197 is secured the pipe 156, whose front downwardly extending end receives the neck of the wrapper carrier 113, which is held in place, with its perforated lower face (Fig. 23) downward, by means of the rod 198, the latter being secured to the face of the carrier and thence extending upward to the front end of the spring 199, to which the rod is secured by means of the disks 200 and 201 and nut 202. The normal tension of the spring 199 when unrestrained keeps the carrier 113 at its upward position, shown in Fig. 24. The carrier 113 is depressed to its lower position only when it is forward to lift the cut wrapper from the die of the wrapper cutting table 114 or rearward to deposit the cut wrapper on the perforated apron 77, and between these two extreme points of its reciprocation said carrier is held in its elevated position. The carrier 113 is depressed at the proper time by means of the rod 203 passing through the stud 204 and carrying the stops 205 and 206, and the dog 207 pivotally mounted between the ears 208 and itself pivotally connected with the front end of the rod 203. The lower rounded end of the dog 207 rests normally on the cam plate 209 between the inclines 210 and 211 thereof, said plate being rigid with the spring 199. When the frame 187 moves forward the rod 203 and pipe 156 travel with it, and just at the time the wrapper carrier 113 arrives over the cutting die on the table 114 the stop 205 comes into contact with the stud 204 and checks the movement of the rod 203, while the pipe 156 travels a slight distance farther onward, the result of this being that the rod 203 will pull the lower portion of the dog 207 rearward, as shown in Fig. 25, thus forcing the dog up the incline 211 of the cam plate 209 and depressing the spring 199, rod 198 and carrier 113 downward. When the frame 187 starts rearward the pressure of the stop 205 is relieved from the stud 204 and the dog 207 returns to its normal upright position, allowing the carrier 113 under the action of the spring 199 to ascend free of the wrapper cutter. The continued rearward movement of the frame 187, with the pipe 156 and rod 203, results in the stop 206 striking the stud 204 and in effect causing the rod 203 to push the lower portion of the dog 207 frontward and up the incline 210, as shown in Fig. 22, and thus securing the depression of the carrier 113 toward the perforated rolling apron 77, on which the carrier will deposit the wrapper carried from the table 114. When the frame 187 again starts forward the stop 206 will be relieved from the stud 204 and the carrier 113 under the action of the spring 199 will ascend to its traveling position, shown in Fig. 24.

The compressor blade 195 is rigidly secured to the L-shaped frame 212, which fits against the rear and lower side of the cross-head 173 and has the elongated sleeves 213 loosely receiving the rods 184 of the frame 187. The frame 212 and sleeves 213 are free on said rods 184 and are normally held at the front end of said rods by the coiled springs 214, so that as the frame 187 travels forward toward the rolling table 154 the frame 212 and blade 195 will move with it until the chain 215 connecting said blade with the weight 216 (Fig. 3) becomes taut, as shown in Fig. 24, at which time, as hereinafter described the weight 216 will hold back the blade 195 and frame 212 while the roller 194 and frame 187 travel a definite distance onward to close the loop in the apron 77 to the proper size. The weight 216 is also connected with a chain 217 which passes upward over a pulley 218 and thence to the cam or eccentric wheel 219, to which it is connected and which when rotated, as hereinafter described, is adapted through the chain 217 to lift and sustain the weight 216 and relieve the strain of the latter from the chain 215. The cam or eccentric wheel 219 is rigid on the shaft of the gear wheels 191 and 192 and hence receives its motion from the toothed segment 189, cam 188 and driving shaft 36. It may be stated here that the wheel 219 and chain 217 take the weight 216 and relieve the blade 195 at that point in the operation of the machine at which the ends of the cigarette are to be trimmed, as shown in Fig. 25.

At the forward end of the frame 187 is the roller 194 adapted to revolve with its shaft 220 and to wind the apron 77 upon itself, as shown in Fig. 25. The shaft 220 has at its outer end the pinion wheel 221 and cam wheel 222, the former adapted to engage the toothed rack 223 and the latter a flat surface or tramway 224, both rack and tramway being on the under side of the plate 225. Upon the shaft 220 at the left of the roller 194 are the disks 226 and 227, sleeve 228, cam 229 and pinion wheel 230, said parts all being connected together and loose on the shaft 220. The pinion wheel 230 and cam 229 are adapted respectively to engage the rack 231 and flat surface or tramway 232, said rack and tramway being on the under side of the plate 225. The disks 226 and 227 are connected together by pins 230 and 231, and the disk 227 has an annular hub 232 entering the sleeve 228 and being secured therein by a set screw 233. Between the disks 226 and 227 and passing between the pins 230 and 231 and shaft 220 is the steel tape 234 having at its free end the block or shoulder 235 and being at its other end rigidly secured to the transverse frame 212 carrying the compressor blade 195 or directly to said blade, as may be found most convenient. The tape 234 during the rolling of a cigarette is utilized to pull the frame 212, blade 195 and weight 216, the block or shoulder 235 at such time having been brought down into contact with the pin 230 and shaft 220 and preventing the free end of the tape from escaping from the disks 226 and 227. The point at which the block or shoulder 235 on the tape 234 will be arrested by the pin 230 will be governed by the location of the pin, and hence the disks 226 and 227 are made adjustable on the shaft 220 by means of the set screw 233, and the disk 226 is given index marks to be used in connection with a fixed pin 236 projecting outward from the roller 194, the purpose of the index and pin 236 being to guide the operator in adjusting the disks 226 and 227 around the shaft 220 and thereby in regulating the position of the pin 230 and the point at which the free end of the tape 234 will be arrested and said tape made to draw the blade 195, and frame 212 and weight 216. The adjustment of the disks 226 and 227 and pin 230 by controlling the point at which the free end of the tape 234 will be arrested determines, as hereinafter explained, the size of the loop in the rolling apron 77 and hence governs the size the cigarettes will have when rolled in said loop. When the disks 226 and 227 are turned to move the pin 230 toward the block or shoulder 235, the said block will be caught by said pin in advance of the point at which it would be caught were said disks turned in the opposite direction, and hence the free end of the tape 234 would not pay out rearward between the disks to the same extent as it would were the disks 226 and 227 turned to move the pin 230 from the block or shoulder 235, and as a consequence the loop in the apron 77, while rolling the cigarette will be smaller than when the disks 226 and 227 are turned to move the pin 230 from the block or shoulder 235, as hereinafter more fully explained.

The indicating marks or index on the disk 226 will be arranged to denote the different sizes of cigarettes to be rolled.

During the first portion of the forward travel of the frame 187 toward the front of the machine, the roller 194 will without revolving advance from the position shown in Fig. 22 to the position shown in Fig. 24 and close the apron 77 over the charge of filler tobacco, thus forming the loop 237 in the apron, and during this movement the springs 214 on the rods 184 keep the frame 212 and blade 195 moving forward with the frame 187, so that the blade 195 may pass over the filler tobacco and loop 237 in the apron 77 to the position shown in Fig. 24, upon arriving at which the chain 215 becomes taut and the effect of the weight 216 (which is of greater strength than the springs 214) is felt on the blade 195 and frame 212. During this partial forward movement of the frame 187 from the position shown in Fig. 22 to that shown in Fig. 24, the roller 194, shaft 220 and sleeve 228 travel forward but do not revolve, and their non-revolving is due to the fact that during such movement the cams 222 and 229 have been against the flat surfaces 224 and 232 and that the pinions 221 and 230 have not been in engagement with the racks 223 and 231. When the frame 187 and roller 194 have reached the position shown in Fig. 24, the weight 216 is as above described on the blade 195, and the further forward movement of the frame 187 and roller 194 results in the tape 234 being drawn down between the disks 226 and 227 until the shoulder or block 235 reaches the pin 230, and the roller 194 has drawn the upper half of the apron 77 sufficiently to reduce the size of the loop 237 appropriately for the cigarette to be rolled. When the block 235 reaches the pin 230 and the frame 187 travels onward to complete its forward movement, the tape 234 draws the frame 212 and blade 195 forward correspondingly with the roller 194, and hence during such continued movement of the frame 187 and roller 194 the size of the loop 237 will remain unchanged, this size having been fixed by the extent of the free end of the tape 234 above the pin 230 paid out during the forward travel of the roller 194 drawing the apron to close the loop 237 under the pressure exerted by the weight 216 on the blade 195. During the completion of the forward movement of the frame 187 and roller 194, the cigarette is rolled on the table 154 until its ends extending from opposite ends of the loop 237 pass beneath the knives 238 (Figs. 23 to 28 inclusive) at which time all pressure is relieved from the cigarette by the cam-wheel 219 coming into play and lifting the weight 216 from the chain 215, and the knives 238 descend by means hereinafter described, and trim the ends of the cigarette, which is then rolled off the front edge of the table 154 and allowed to fall through an opening 239 into any suitable receiving receptacle. When during the forward travel of the frame 187 and roller 194, the loop 237 has been closed and reduced to size, the cams 222 and 229 will pass from contact with the flat surfaces 224 and 232 and the pinion wheels 221 and 230 will engage the racks 223 and 231, and hence on the continued forward movement of the roller 194 and frame 187 the shaft 220, sleeve 228, disks 226 and 227 and roller 194 will revolve and take up the upper part of the apron 77 and tape 234. If it should at any time be desired to reduce the size of the cigarettes to be made on the machine, the operator will adjust the disks 226 and 227 to take the pin 230 farther from the block 235, and in that manner lengthen the extent of tape 234 between the said pin and block and permit the roller 194 to travel a greater distance forward closing the loop 237 before the block 235 reaches the pin 230 and starts to draw the blade 195 forward with the roller 194; and if it should be desired to increase the diameter of the cigarettes, the operator will adjust the disks 226 and 227 to bring the pin 230 nearer to the block 235, and thus shorten the extent of the tape 234 between the said pin and block and to a corresponding degree shorten the travel the roller 194 can make closing the loop 237 before the said block and pin meet and the tape 234 starts to draw the blade 195 and frame 212 forward correspondingly with the roller 194. After the cigarette has had its ends trimmed by the knives 238 and the fallen through the opening 239, the frame 187 will under the control of the segment 189, gear wheels 191 and 192, and rack 193 return to its rear position, the cam wheel 219, in the meantime, gradually lowering the weight 216 and the pinion wheels 221 and 230 effecting a reversal of the movement of the roller 194 and sleeve 228 to unwind the apron 77 and tape 234, thereby restoring the parts to their normal relation preparatory to repeating the operation of rolling another cigarette.

The knives 238 are pivoted to upright lugs or ears at opposite sides of the opening 239, as shown in Figs. 25 and 26, and these knives are connected by the arms 240 with the rod 241 which connects said arms and is itself connected with the arm 242 which extends rearward as shown in Fig. 6, and is engaged by a cam 243 on the main driving shaft. The purpose of the cam 243 and rod 242 is simply from the driving shaft to effect the movement of the knives 238 to cut the ends of the cigarettes.

In the foregoing description there has been presented a full explanation of the operation of the mechanism for feeding the filler tobacco and forming the separate charges thereof for the cigarettes, and also of the mechanism for cutting the wrappers or binders for the cigarettes, applying the line of paste to the edge thereof and conveying the wrappers after being cut and bearing the line of paste to the perforated rolling apron, where they are held under air pressure during the operation of rolling the cigarette. The mechanism for rolling the cigarette and trimming the ends thereof has also been fully explained in the foregoing description and the operation of said mechanism although pointed out may be briefly referred to, to amplify the specification. Each reciprocating movement of the shuttle 76 from the feed mechanism to the rolling apron 77 results in the shuttle depositing on said apron in rear of the slotted and slightly elevated rolling table 154 a charge of filler tobacco suitable for one cigarette, and each reciprocating movement of the pneumatic carrier 113 from the wrapper cutting and pasting table 114 to the rolling table 154 results, as hereinbefore described, in there being delivered upon the apron 77 in front of said charge of filler tobacco (Fig. 26) a wrapper or binder suitable to receive the filler tobacco and form the cigarette. Upon the delivery upon the rolling apron 77 of the charge of filler tobacco and the wrapper, as shown in Fig. 26, the shuttle 76 returns to the feed mechanism to receive a further charge of filler tobacco, and the frame 187, under the action of the segment 189, gear wheels 191 and 192 and rack 193, starts forward toward the front of the machine, carrying with it the roller 194 and compressor blade 195, the latter being held against the cross head 173 during a part of such movement by the springs 214, and the roller being in greater part inclosed by a rigid sheet metal fender or dust excluding shield 254, which may be omitted if preferred. The forward movement of the frame 187, roller 194 and blade 195 has the effect of folding the apron 77 over the filler tobacco to form the usual loop or bight 237, as indicated in Figs. 23 and 24, and thereafter, the roller 194 and blade 195 having reached the position shown in Fig. 24 and the chain 215 having become taut, the frame 187 and roller 194 will continue forward drawing the apron with it and closing the loop thereof to a definite size around the filler tobacco, while the blade 195 is held back against the force of the springs 214 by the weight 216, until the block or shoulder 235 on the tape 234 reaches the pin 230, at which time the loop 237 having been drawn down to size and the filler tobacco confined therein against the back pressure exerted by the blade 195 and weight 216, the blade 195 will be pulled forward by the tape 234 and travel with the frame 187 and roller 194 to the position shown in Fig. 25, the result being that the filler tobacco will be rolled along the table 154 into the wrapper to form the cigarette, which will have its ends trimmed by the knives 238 and then fall through the opening 239. During the latter portion of the travel of the roller 194 and blade 195, the apron 77 and tape 234 will be wound up owing to the action of the shaft 220 and sleeve 228. The winding of the apron 77 on the roller 194 is because in the present instance the rear end of the apron is attached to the roller and by winding the apron on the roller the latter may have a comparatively short travel while a cigarette is completely rolled. The winding of the steel tape 234 on the shaft 220 has the effect of causing the frame 212 and blade 195 (which were held back by the weight 216 when the roller 194 traveled forward to draw the loop 237 down to size) to gradually approach the cross-head 173 and thus to prevent the roller 194 during its winding of the apron from reducing the size of the loop 237 after the latter has once been fixed. The forward travel of the blade 195 by the winding up of the tape 234, while at the same time the entire frame 187 is moving forward, gives the blade 195 a rather more rapid movement than the roller 194 and hence the said blade is enabled to maintain a position with respect to the loop 237 which prevents the latter from being reduced in size during the winding of the apron 77 on the roller 194. The more rapid forward movement of the blade 195 just above referred to will not be necessary when the diameter of the roller 194 is such that the roller has no tendency to more rapidly wind up the upper part of the apron 77 than the lower part thereof is given up around the loop 237, nor when the apron is the ordinary stationary apron fastened at each end and the roller is simply the usual reciprocating roller. The blade 195 moves forward with the roller 194 so as to get over the charge of filler tobacco when the latter and the loop of the apron are loose, and then the blade 195 is held stationary by the weight 216 until the loop 237 has been drawn down to size, and thereafter the blade and roller move onward, the blade being at the front of the loop and retaining the latter in its closed and the tobacco in its compressed condition.

As above described, when the cigarette reaches the knives 238, the cam-wheel 219 will have taken up enough of the chain 217 to relieve the chain 215 from the strain of the weight 216. During the forward travel of the frame 187, roller 194 and blade 195, the pipe 156, pneumatic carrier 113 and rod 203 also travel forward, and the relation of the parts is such that when the cigarette is rolled off the front end of the table into the opening 239 the carrier 113 will be over the wrapper cutting die on the table 114 and the stop 205 will meet the stud 204 and turn the dog 207 to depress the carrier 113 upon the wrapper on said cutting die; at the same time the valve 157 will cut off the air from the pipe 146, compartment 143 and pipe 153, as shown in Fig. 6, and open the pipes 155 and 156 and carrier 113 to the action of the air suction, thus releasing the wrapper on the cutting die and causing the carrier 113 to take the wrapper therefrom. Upon the return movement of the frame 187 to its rear position the apron 77 and tape 234 will unwind to their normal position, the cam 219 will pay out the chain 217 and restore the weight 216 to the chain 215, the weight 216 will return to its support, the spring 199 will restore the dog 207 to its vertical position and elevate the carrier 113 carrying the wrapper, and the pipe 156 will telescope into the pipe 155 until the carrier 113 is directly over the apron 77 and table 154 and the stop 206 and has met the stud 204 and turned the dog 207 to depress the said carrier 113, at which time (the shuttle 76 having deposited another charge of tobacco on the apron 77) the valve 157 will cut off the pipes 155 and 156 and carrier 113 from and open the pipes 146 and 153 to the action of air suction, and thus cause the wrapper to be released by the carrier 113 and immediately taken by the perforated rolling apron 77 (Fig. 4) preparatory to receiving the charge of filler tobacco on the subsequent forward movement of the frame 187 to roll a cigarette. During the latter portion of the return movement of the frame 187 to the rear, the weight 216 reaches the floor or other rest, the chain 215 slackens and the springs 214 keep the bar 212 against the cross-head 173, while the steel tape 234 pushes upward between the shaft 220 and pins 230 and 231, as shown in Fig. 27, preparatory to controlling the size of the loop in the apron 77 on the following forward movement of the frame 187.

With each forward movement of the frame 187 one trimmed cigarette is rolled from the front edge of the rolling table and a wrapper is taken from the cutting die on the table 114 by the carrier 113, and with each rearward movement of the frame 187 the apron 77 is returned to position to receive another charge of filler tobacco from the shuttle 76 and a wrapper is conveyed by the carrier 113 to the rolling table 154 to receive said charge of tobacco on the next forward movement of the frame 187.

The capacity of the machine hereinbefore described is governed by the operator's ability to cut the wrappers for the cigarettes, and experience has demonstrated that a skilled operator is able usually to cut about five thousand wrappers in a day of ten hours; hence the usual capacity of the machine is about five thousand cigarettes per day, although it will be understood that with greater speed on the part of the operator in cutting the wrappers the capacity of the machine would be increased.

Without limiting myself to the details of construction, what I claim as my invention, and desire to secure by Letters Patent, is—

1. The feed belt for the filler tobacco, and pawl and ratchet mechanism for imparting motion thereto, combined with the spring supported table on which the filler tobacco for a cigarette is fed, the spring supported plate above said table, the sensitive plate between said table and plate and against which the tobacco is fed by said belt, the knife pivoted at one end for severing the charge of tobacco, and mechanism intermediate said sensitive plate and the mechanism imparting motion to the belt whereby the latter is stopped by the movement of said sensitive plate due to the pressure of the filler tobacco; substantially as and for the purposes set forth.

2. The feed belt for the filler tobacco, and pawl and ratchet mechanism for imparting motion thereto, combined with the spring supported table on which the charge for a cigarette is fed, the sensitive plate above said table and against which the tobacco is fed, the knife pivoted at one end for severing the charge of tobacco, and mechanism intermediate said sensitive plate and the mechanism imparting motion to the belt whereby the latter is stopped by the movement of said sensitive plate due to the pressure of the filler tobacco; substantially as and for the purposes set forth.

3. The feed belt for the filler tobacco, and pawl and ratchet mechanism for imparting motion thereto, combined with the table on which the tobacco for a cigarette is fed, the plate above said table, the sensitive plate between said table and plate and against which the tobacco is fed, the shaft loosely receiving said table and plate, the independent unequal springs at one end respectively supporting said table and plate and at the other end rigidly secured to said shaft, the knife for severing the charge of tobacco, mechanism for rotating said shaft and turning said table, plate and springs downward to discharge the filler tobacco therefrom, and mechanism intermediate said sensitive plate and the mechanism imparting motion to the belt whereby the latter is stopped by the movement of said sensitive plate due to the pressure of the filler tobacco; substantially as set forth.

4. The feed belt for the filler tobacco, and pawl and ratchet mechanism for imparting motion thereto, combined with the spring supported table on which the filler tobacco for a cigarette is fed, the plate above said table, the sensitive plate between said table and plate and against which the tobacco is fed, the knife pivoted at one end for severing the charge of tobacco, the shaft receiving said table and its spring and the plate above it, mechanism for rotating said shaft and turning the table downward to discharge the filler tobacco thereon, and mechanism intermediate said sensitive plate and the mechanism imparting motion to the belt whereby the latter is stopped by the movement of said sensitive plate due to the pressure of the filler tobacco; substantially as and for the purposes set forth.

5. The feed belt for the filler tobacco and mechanism for imparting motion thereto, combined with the table on which the filler tobacco for a cigarette is fed, the sensitive plate above said table and against which the tobacco is fed, the arms intermediate said plate and the longitudinally adjustable support therefor, the knife for severing the charge of tobacco, and mechanism intermediate said sensitive plate and the mechanism imparting motion to the belt whereby the latter is stopped by the movement of said sensitive plate due to the pressure of the filler tobacco; substantially as and for the purposes set forth.

6. The feed belt for the filler tobacco, and the pawl and ratchet mechanism for imparting motion to said belt, combined with the table on which the filler tobacco is fed, the sensitive plate on said table the rock shaft to which said plate is connected, the trip-arm on said shaft, the pivoted weighted rod engaging said arm, the segment adjacent to the said ratchet, the lever engaging said segment to raise and lower the same and connected with said pivoted rod, means for re-engaging said trip-arm and pivoted rod and lowering said segment, and the knife for severing the charge of tobacco; substantially as and for the purposes set forth.

7. The feed belt for the filler tobacco and mechanism for imparting motion thereto, combined with the table on which the tobacco for a filler is fed, the sensitive plate against which the tobacco is fed the rock shaft to which said plate is connected, the knife for severing the charge of tobacco, means intermediate said rock shaft and the mechanism imparting motion to said belt whereby the latter is stopped by the movement of said shaft, an arm extending from said shaft toward the knife, and an arm on the knife, to engage said last mentioned arm and insure the stoppage of the feed mechanism during the descent of the knife; substantially as and for the purposes set forth.

8. The feed belt for the filler tobacco and mechanism for imparting motion thereto, combined with the table on which the tobacco is fed, the frame above said table, the sensitive plate between said table and frame, the pivoted top plate above said frame, the knife for severing the charge of tobacco for a cigarette, mechanism intermediate said sensitive plate and the mechanism imparting motion to the belt whereby the latter is stopped by the movement of said sensitive plate, mechanism for turning the said top plate upward when the knife descends, and mechanism for turning said table and frame downward to discharge the severed filler tobacco; substantially as and for the purposes set forth.

9. The feed belt for the filler tobacco the rollers on which said belt is mounted, mechanism for imparting motion thereto, the feed roller over the inner roller of said belt and beneath which the tobacco feeds, the throat formed at the outlet between said rollers, and mechanism for revolving said feed roller, combined with the spring supported yielding table on which the filler tobacco passes from said throat and is severed by the knife, the sensitive plate on said table and against which the tobacco is fed, the knife pivoted at one end for severing the charge of tobacco for a cigarette, mechanism intermediate said sensitive plate and the mechanism imparting motion to the belt whereby the latter is stopped by the movement of said sensitive plate, and mechanism for turning said table downward to discharge the filler tobacco; substantially as and for the purposes set forth.

10. In a cigarette machine the feed belt for the filler tobacco, mechanism imparting motion thereto, a table beyond the belt to support the protruding portion of the tobacco while the charge is being severed and the vertically movable knife for severing the charges thereof, combined with the cigarette rolling apron located to one side of the said feed belt, the shuttle which receives said charges and having the pivoted door and latch, mechanism for reciprocating said shuttle in a horizontal direction over the bed plate of the machine from said feed mechanism to the rolling apron, the stud for freeing said latch when the shuttle is over the rolling apron, and the incline for closing said door on the return of the shuttle to the feed mechanism; substantially as and for the purposes set forth.

11. The rolling mechanism comprising a perforated rolling apron and air suction apparatus in communication therewith, combined with a cutting die in the outline of the wrapper to be used and air suction apparatus connected with said die, a pneumatic wrapper carrier reciprocating between said cutting die and apron, and means for releasing the wrapper at the die when it is to be taken up by the carrier, and releasing it from the carrier when it is to be given to the rolling apron; substantially as and for the purposes set forth.

12. The rolling mechanism comprising a rolling apron, combined with a cutting die in the outline of the wrapper to be used, air suction apparatus connected with said die, a pneumatic wrapper carrier reciprocating between said cutting die and apron, and means for releasing the wrapper at the die when it is to be taken up by the carrier and releasing it from the carrier when it is to be given to the rolling apron; substantially as and for the purposes set forth.

13. In a cigarette machine the rolling mechanism comprising a rolling apron, and co-operating means for rolling the cigarette therein and the wrapper cutting table having dies in the outline of the wrappers to be cut, said table being movable to change the position of the dies, combined with the pneumatic wrapper carrier means for reciprocating it with the rolling mechanism between said apron and dies, and means for releasing the wrapper from the carrier at the rolling apron; substantially as and for the purposes set forth.

14. The rolling mechanism comprising a rolling apron, and co-operating means for rolling the cigarette therein combined with the wrapper cutting table, dies on said table in the outline of the wrappers to be cut, air suction apparatus connected to said dies, mechanism for applying paste to one edge of the wrapper, a reciprocating wrapper carrier adapted to travel between said dies and said apron, means for reciprocating said carrier means for releasing the wrapper at the cutting die when taken by the carrier and means for releasing the wrapper from the carrier when the latter is over the apron; substantially as and for the purposes set forth.

15. The rolling mechanism comprising a perforated rolling apron, and air suction apparatus connected to the rolling table, combined with the revoluble wrapper cutting table bearing dies in the outline of the wrappers to be cut, air suction apparatus connected to said dies, mechanism for applying paste to one edge of the wrapper while held on a cutting die, a pneumatic wrapper carrier connected with the rolling mechanism means for reciprocating it between said cutting table and said apron, and operating valves for said air suction; substantially as and for the purposes set forth.

16. The rolling mechanism comprising a perforated rolling apron, and air suction apparatus connected therewith, combined with the cutting die in the outline of the wrappers to be cut, air suction apparatus connected therewith, the pneumatic wrapper carrier, the reciprocating telescoping tube carrying said pneumatic wrapper carrier, means for depressing said carrier upon the cutting die to take the wrapper therefrom, means for reciprocating the carrier and for depressing it upon the rolling apron to deliver the wrapper thereto, and valves for releasing the wrapper from the die and tube; substantially as and for the purposes set forth.

17. The rolling mechanism comprising a perforated rolling apron and air suction apparatus connected therewith, combined with the pneumatic cutting die in the outline of the wrappers, means for applying paste to one edge of the wrapper while on the die, a pneumatic wrapper carrier connected with and traveling in advance of rolling mechanism for taking a wrapper from the die and delivering it to the apron on the rear movement of the rolling mechanism, and valves for releasing the wrapper at the die and carrier; substantially as and for the purposes set forth.

18. The rolling mechanism, and the feed mechanism of a cigarette machine, combined with the revoluble wrapper cutting table, the dies on said table in the outline of the wrappers to be cut, air suction apparatus connected therewith, means for applying paste to one edge of the wrapper while on a die, means for carrying the cut wrapper from the die to the rolling mechanism, means for releasing the wrapper at the cutting die when taken by the carrier; and means for releasing it when over the apron substantially as and for the purposes set forth.

19. The rolling mechanism means for operating the same, and the feed mechanism of a cigarette machine, combined with the revoluble wrapper cutting table, the dies on said table in the outline of the wrappers to be cut, air suction apparatus connected therewith, means for applying paste to the edge of the wrapper while on the die, a pneumatic wrapper carrier reciprocating with the rolling mechanism for carrying the wrapper from the die to said rolling mechanism, means for releasing the wrapper at the cutting die when taken by the carrier; and means for releasing the wrapper from the carrier when the latter is over the apron substantially as and for the purposes set forth.

20. A cigarette machine comprising in its structure feed mechanism for the filler tobacco a knife for severing the charges thereof, rolling mechanism for rolling the cigarette, and a traveling shuttle for conveying the separate charges of filler tobacco from the feed mechanism to the rolling mechanism, combined with a wrapper cutting table, a die thereon in the outline of the wrapper to be cut, air suction apparatus connected therewith, means for applying paste to the edge of the wrapper while on the die, means for conveying the cut wrapper from the die to the rolling mechanism, and means for releasing the wrapper at the cutting die when taken by the carrier; substantially as and for the purposes set forth.

21. A cigarette machine comprising in its structure feed mechanism for the filler tobacco a knife for severing the charges thereof, rolling mechanism having a perforated rolling apron and supporting table, air suction apparatus connected therewith, and a traveling shuttle for conveying the separate charges of filler tobacco from the feed mechanism to the rolling mechanism, combined with a wrapper cutting table, a die thereon in the outline of the wrapper to be cut, air suction apparatus connected therewith, means for applying paste to the edge of the wrapper while on the die, a pneumatic wrapper carrier connected with the rolling mechanism means for reciprocating said carrier between said die and apron, and means for releasing the wrapper at the cutting die when taken by the carrier; substantially as and for the purposes set forth.

22. In a cigarette machine the rolling apron and the reciprocating roller which folds said apron over the filler tobacco, combined with the compressor blade adapted to travel with said roller, means for holding the said blade against the loop in said apron while the said roller moves a definite distance onward to draw the loop down to size against said blade, and means for causing the said blade to follow said roller after the loop has been drawn down to size; substantially as and for the purposes set forth.

23. In a cigarette machine the rolling apron, and the reciprocating roller which folds said apron over the filler tobacco, combined with the compressor blade adapted to travel with said roller, means for holding the said blade against the loop in said apron while the said roller moves a definite distance onward to draw the loop down to size against said blade; means for adjusting the distance said roller may travel ahead of said blade while closing said loop, and means for causing the said blade to follow said roller after the loop has been drawn down to size; substantially as and for the purposes set forth.

24. In a cigarette machine, the rolling apron, and the reciprocating roller which folds said apron over the filler tobacco, combined with the compressor blade adapted to travel with said roller, the springs exerting their tension against said blade to carry it over the filler tobacco and loop of said apron, the chain holding said blade after having passed over said loop while the said roller moves onward to draw said loop down to size, and means for causing the said blade to follow said roller after the loop has been drawn down to size; substantially as and for the purposes set forth.

25. In a cigarette machine, the rolling apron, and the reciprocating roller which folds said apron over the filler tobacco, combined with the compressor blade adapted to travel with said roller until it has passed over the loop in the apron, a free connection intermediate the roller and blade which permits the roller to travel onward without the blade a definite distance to draw the loop in the apron down to size, and a stop on the said connection to cause the blade to follow the roller after the said loop has been drawn down to size; substantially as and for the purposes set forth.

26. In a cigarette machine, the rolling apron, and the reciprocating roller which folds said apron over the filler tobacco, combined with the compressor blade adapted to travel with said roller until it has passed over the loop in the apron, the tape having a stop on its free end and extending from said blade to the shaft of said roller, the disks on said shaft receiving between them said free end of said tape, a pin between said disks to retain said tape and engage said stop thereon and means for adjusting said disks to regulate the point at which said stop will be caught by said pin; substantially as and for the purposes set forth.

27. In a cigarette machine, the rolling apron, and the reciprocating roller which folds said apron over the filler tobacco, combined with the compressor blade adapted to travel with said roller until it has passed over the loop in the apron, the tape having a stop on its free end and extending from said blade to the shaft of said roller, means for retaining said free end against said shaft and arresting said stop after the roller has traveled onward alone a definite distance to draw the loop down to size, means for holding said blade against the said loop until the roller has drawn the loop to size, and gearing for revolving said roller and shaft to wind said apron and tape during the rolling of the cigarette; substantially as and for the purposes set forth.

28. In a cigarette machine, the rolling apron, and the reciprocating frame carrying a roller which folds said apron over the filler tobacco, combined with the compressor blade the cross bar to which said blade is connected and which is supported by rods of said frame, the springs on said rods and exerting their tension to keep the said blade normally forward to follow the roller, the chain connected with said blade to arrest it after it has passed over the loop in the apron, while the roller moves onward to draw the loop to size against said blade, and means for causing the blade to follow the roller while the cigarette is being rolled; substantially as and for the purposes set forth.

29. In a cigarette machine, the rolling mechanism, and the wrapper table, combined with the paste receptacle, the traveling paste carriage, the threaded tube carried thereby, the sliding frame in which said tube is mounted and which holds the paste-brush, the set screw engaging said tube for adjusting the brush vertically, and the set screw connected with said sliding frame for adjusting said brush laterally; substantially as and for the purposes set forth.

30. In a cigarette machine, the rolling mechanism, and the wrapper table, combined with the paste receptacle, the traveling carriage carrying the paste-brush, the tramway on which the roller of said carriage moves, and the sliding block having inclined ends mounted on said tramway in the path of said roller; substantially as and for the purposes set forth.

31. In a cigarette machine, the rolling mechanism, and the wrapper table, combined with the paste receptacle, the traveling carriage held down upon its tramway, the roller having its axle confined in vertical slots in said carriage and connected with the brush supporting frame, the springs pressing upon said axle, the movable block having inclined ends and retained on said tramway in the path of said roller, and means for reciprocating said carriage from the paste receptacle to the wrapper table and back to said receptacle; substantially as and for the purposes set forth.

32. In a cigarette machine, the rolling mechanism, combined with the revoluble wrapper cutting table having upon its upper surface the hollow cutting dies in the outline of the wrappers to be cut, the frame supporting said table and containing independent compartments, communicating with said cutting dies, air pipes leading to said compartments, air suction apparatus connected with said pipes, and means for cutting off the air from one of said compartments without disturbing the suction in the other compartment; substantially as and for the purposes set forth.

Signed at the city of New York, in the county and State of New York, this 16th day of February, 1894.

JOHN R. WILLIAMS.

Witnesses:
CHAS. C. GILL,
WILLIAM B. ELLISON.